(12) United States Patent
Enokido et al.

(10) Patent No.: US 6,243,835 B1
(45) Date of Patent: Jun. 5, 2001

(54) TEST SPECIFICATION GENERATION SYSTEM AND STORAGE MEDIUM STORING A TEST SPECIFICATION GENERATION PROGRAM

(75) Inventors: Shigenori Enokido; Isami Kawabata; Hiromi Akuta, all of Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/154,704

(22) Filed: Sep. 17, 1998

(30) Foreign Application Priority Data

Jan. 30, 1998 (JP) .................................................. 10-018446

(51) Int. Cl.[7] .................................................. G06F 11/263
(52) U.S. Cl. .................................................. 714/38; 714/33
(58) Field of Search ................................. 714/33, 38, 738

(56) References Cited

U.S. PATENT DOCUMENTS

| 4,819,233 | * | 4/1989 | Delucia et al. . |
| 5,652,835 | * | 7/1997 | Miller . |
| 5,799,266 | * | 8/1998 | Hayes . |
| 5,905,856 | * | 5/1999 | Ottensooser . |
| 6,002,869 | * | 12/1999 | Hinckley . |
| 6,038,378 | * | 3/2000 | Kita et al. . |

FOREIGN PATENT DOCUMENTS 9-6604    1/1997   (JP) .

OTHER PUBLICATIONS

Patent Abstracts of Japan, No. 03282637, published Dec. 12, 1991.

* cited by examiner

Primary Examiner—Paul R. Myers
(74) Attorney, Agent, or Firm—Staas & Halsey LLP

(57) ABSTRACT

A test specification generation system which utilizes a repository of design information entered in a design process so as to enhance operational efficiency of a testing process. A data analysis device reads statements written in the test configuration file, line by line, to thereby determine whether a read statement line is a fixed output line or a program output line. A test item determination device determines whether generation of a test item requires design information alone or not only the design information but also information from a standard test item file stored in a standard test item storage device. A first test item generation device generates test items based on information that the design information reading device obtained from tables of the design information, while a second test item generation device generates test items from the tables and the standard test item file. A test specification writing device outputs fixed output lines and test items generated by the first test item generation device and the second test item generation device, to generate a test specification file.

7 Claims, 28 Drawing Sheets

SUBSYSTEM LIST　／⁻71

| SUBSYSTEM No. | SUBSYSTEM ID | NAME |
|---|---|---|
| 1 | JYU | RECEIVED ORDER |
| 2 | HTY | PURCHASE ORDER |
| 3 | KBI | PURCHASE |
| 4 | GNK | COST PRICE |
| 5 | JNJ | PERSONNEL AFFAIRS |

FIG. 6

PROGRAM LIST (SUBSYSTEM ID=JYU) /72

| No. | PROGRAM ID | PROGRAM NAME | TYPE |
|---|---|---|---|
| 1 | JYU01OVE | RECEIVED ORDER INPUT (NO SECTION) | ENTRY (DETAIL) |
| 2 | JYU014VE | MULTI DETAIL TEST | ENTRY (DETAIL) |
| 3 | JYU02OVE | RECEIVED ORDER INPUT (WITH SECTION) | ENTRY (DETAIL) |
| 4 | JYU03OVE | COMMUNICATION TEST BETWEEN PROGRAMS | KEY ENTRY |
| 5 | JYU04OVE | CUSTOMER INQUIRY | INQUIRY (CARD) |
| 6 | JYU11OVE | RECEIVED ORDER INPUT (3EXE) | ENTRY (DETAIL) |
| 7 | JYU13OVE | COMMUNICATION TEST BETWEEN PROGRAMS (3EXE) | INQUIRY (CARD) |
| 8 | JYU14OVE | CUSTOMER INQUIRY (3EXE) | INQUIRY (CARD) |
| 9 | JYU21OVE | RECEIVED ORDER INPUT (MOCK-UP) | ENTRY (DETAIL) |

FIG. 7

SCREEN LIST (SUBSYSTEM ID=JYU) 73

| No. | FORM ID | FORM NAME | TYPE |
|---|---|---|---|
| 1 | JYU01001 | RECEIVED ORDER INPUT SCREEN (NO SECTION) | ENTRY (DETAIL) |
| 2 | JYU01002 | MULTI FORM TEST | KEY ENTRY |
| 3 | JYU01003 | RECEIVED ORDER DETAIL INPUT | ENTRY (CARD) |
| 4 | JYU01004 | MULTI DETAIL TEST | ENTRY (DETAIL) |
| 5 | JYU02001 | RECEIVED ORDER INPUT SCREEN (WITH SECTION) | ENTRY (DETAIL) |
| 6 | JYU03001 | COMMUNICATION TEST BETWEEN PROGRAMS | KEY ENTRY |
| 7 | JYU04001 | CUSTOMER INQUIRY | INQUIRY (CARD) |
| 8 | Jyu1 | RECEIVED ORDER INPUT SCREEN | ENTRY (CARD) |
| 9 | JYU11001 | RECEIVED ORDER INPUT (3EXE) | ENTRY (DETAIL) |
| 10 | JYU13001 | COMMUNICATION TEST BETWEEN PROGRAMS (3EXE) | INQUIRY (CARD) |
| 11 | JYU14001 | CUSTOMER INQUIRY (3EXE) | INQUIRY (CARD) |

FIG. 8

ACTION LIST 74

| ACTION NAME | ACTION ID | PF KEY | NAME |
|---|---|---|---|
| PRECEDING PAGE | BFR | F01 | PRECEDING PAGE |
| NEXT PAGE | NXT | F02 | NEXT PAGE |
| COMPLETION OF ENTRY | ENT | F12 | COMPLETION OF ENTRY |
| CANCEL | ESC | F09 | CANCEL |
| END | FIN | F10 | END |
| HELP | HLP | F01 | HELP |
| SEARCH | COD | F08 | SEARCH |
| MODE CHANGE | MOD | F07 | MODE |
| REGISTRATION | NEW | F05 | REGISTRATION |
| CORRECTION | UPD | F06 | CORRECTION |
| DELETE | DLT | F07 | DELETE |
| RECEIVED ORDER DETAIL INPUT | JSS | F06 | RECEIVED ORDER DETAIL |
| CUSTOMER INQUIRY | TKI | F07 | CUSTOMER |
| REGISTRATION CONFIRMATION | TKN | F12 | REGISTRATION CONFIRMATION |
| EXTRA PROGRAM | EPG | F07 | EXTRA PROGRAM |
| INQUIRY SUB | SUB | F01 | INQUIRY SUB |
| START OF SEARCH | STR | F12 | START OF SEARCH |
| IMAGE DISPLAY | IMG | F07 | IMAGE |
| CHART SELECTION | RET | F11 | CHART SELECTION |

FIG. 9

INPUT-OUTPUT INFORMATION DEFINITION LIST (FORM ID=JYU01001) ~75

| No | ITEM NAME | G | L | TYPE | ATTRIBUTE | DIGIT NUMBER | DECIMAL PLACE NUMBER | MAXIMUM LENGTH | FORMAT | T | I | ESSENTIAL INPUT | C | CODE ID | DISPLAYED ITEM NAME |
|---|---|---|---|---|---|---|---|---|---|---|---|---|---|---|---|
| 1 | RECEIVED ORDER NUMBER | 0 | | TEXT | NUMERICAL, + | 06 | 00 | 00 | | 0 | 2 | | | | |
| 2 | PROCESSING MODE | 0 | | LABEL | JAPANESE | 02 | 00 | 00 | | 0 | 0 | | | | |
| 3 | ENTER 00 POINT | 0 | | COMMAND BUTTON | BUTTON OFF | 00 | 00 | 00 | | 0 | 0 | | | | |
| 4 | CUSTOMER CODE | 1 | | TEXT | NUMERICAL ONLY | 06 | 00 | 00 | | 0 | 2 | | 1 | TOK | TOKNM |
| 5 | CUSTOMER NAME | 1 | | LABEL | JAPANESE | 20 | 00 | 00 | | 0 | 0 | | | | |
| 6 | BUSINESS CONNECTION TYPE | 1 | | COMBO BOX | EXCEPT ' " , | 04 | 00 | 00 | | 0 | 2 | | 1 | TOR | TORKBNM |
| 7 | BUSINESS CONNECTION TYPE NAME | 1 | | LABEL | JAPANESE | 05 | 00 | 00 | | 0 | 0 | | | | |
| 8 | DELIVERY DATE | 1 | | TEXT | DATE/TIME | 08 | 00 | 00 | yyyy/mm/dd | 0 | 2 | ALL DIGITS | | | |
| ... | ... | ... | ... | | ... | ... | ... | ... | ... | ... | ... | ... | ... | ... | ... |
| 14 | SLIP REMARK | 1 | | TEXT | JAPANESE | 30 | 00 | 00 | | 0 | 1 | | | | |
| 15 | ENTER 01 POINT | 1 | | COMMAND BUTTON | BUTTON OFF | 00 | 00 | 00 | | 0 | 0 | | | | |
| 16 | DETAIL SELECTION CHECK BOX | 5 | DETAIL | CHECK BOX | EXCEPT ' " , | 01 | 00 | 00 | | 0 | 0 | | | | |
| 17 | DETAIL NUMBER | 5 | DETAIL | LABEL | NUMERICAL, + | 02 | 00 | 00 | | 0 | 0 | | | | |
| 18 | ARTICLE CODE | 5 | DETAIL | COMBO BOX | EXCEPT ' " , | 07 | 00 | 00 | | 0 | 2 | ALL DIGITS | 1 | SHO | SHONM |
| 19 | ARTICLE NAME | 5 | DETAIL | LABEL | JAPANESE | 15 | 00 | 00 | | 0 | 0 | | | | |
| 20 | ARTICLE UNIT | 5 | DETAIL | LABEL | JAPANESE | 02 | 00 | 00 | | 0 | 0 | | | | |
| 21 | QUANTITY OF RECEIVED ORDERS | 5 | DETAIL | TEXT | NUMERICAL, + - | 06 | 00 | 00 | #,### | 0 | 2 | ESSENTIAL INPUT | | | |

FIG. 10

ACTION DETAIL DEFINITION LIST (FORM ID = JYU01001)

GROUP 0
SWITCHING BETWEEN MODES, RELATED TO DATA-PROCESSING SECTIONS, ETC.  BUTTON ID: B001   ENTER RECEIVED ORDER NUMBER
MESSAGE ID: I009

| PF KEY | ACTION ID | ACTION NAME | ACTION TYPE | ACTION INFORMATION |
|---|---|---|---|---|
| F01 | SUB | INQUIRY SUB | ETC | |
| F05 | NEW | REGISTRATION | ETC | |
| F06 | UPD | CORRECTION | ETC | |
| F07 | DLT | DELETE | ETC | |
| F10 | FIN | END | END | |
| F12 | ENT | COMPLETION OF ENTRY | GRP | 1 |

GROUP 1
HEAD KEY ENTRY   BUTTON ID: B006   ENTER RECEIVED ORDER NUMBER
MESSAGE ID: I001

| PF KEY | ACTION ID | ACTION NAME | ACTION TYPE | ACTION INFORMATION |
|---|---|---|---|---|
| F03 | JSS | RECEIVED ORDER DETAIL | FRM | JYU01003 |
| F04 | TKI | CUSTOMER | EXE | JYU040VE |
| F06 | UPD | CORRECTION | ETC | 5 |
| F07 | DLT | DELETE | ETC | 5 |
| F08 | COD | SEARCH | COD | |
| F10 | FIN | END | END | |
| F12 | ENT | COMPLETION OF ENTRY | GRP | 5 |

GROUP 5
BODY DETAIL TYPE   BUTTON ID: B003   ENTER RECEIVED ORDER NUMBER
MESSAGE ID: I011

| PF KEY | ACTION ID | ACTION NAME | ACTION TYPE | ACTION INFORMATION |
|---|---|---|---|---|
| F01 | BFR | PRECEDING PAGE | M_B | |
| F02 | NXT | NEXT PAGE | M_N | |
| F07 | DLT | DELETE | ETC | |
| F08 | COD | SEARCH | COD | |
| F11 | ESC | CANCEL | ESC | 1 |
| F12 | ENT | COMPLETION OF ENTRY | GRP | 7 |

FIG. 11

TEST CONFIGURATION INI FILE
"SUBSYSTEM" VERSION

!!!!! LEVEL 1

1,#1010_SUBSYSTEM

1, Connection test, " "

2, Connection test between subsystems, " "

2, Connection test between systems, " "

1, System test, " "

2, Multiuser test, " "

2, Performance test, " "

2, Stress test, " "

2, Volume test, " "

2, Operating environment test, " "

2, Function test, " "

3, System designer test, " "

3, Third party test, " "

FIG. 12

TEST CONFIGURATION INI FILE
"PROGRAM" VERSION

!!!!! LEVEL 1 (STANDARD TEST ITEM, INI)

1, #0010_PG
2, Unit testing, "Testing is performed object by object."
3, Business capability test, "Capability demanded by customers is ..."
3, User interface test, " "
3, Database transaction test, "Database is ..."
4, Transaction cancel test, "Transaction cancel is ..."
3, Screen field test, "Data attributes corresponding to ..."
4, #0020_FORM
5, #0030_ACTION
5, #0040_IN_ITEM
5, #0050_OUT_ITEM
5, Screen entry field protect test, " Entry fields of screen are ..."
5, #0070_DETAILS_CONTROL
5, Focus setting procedure test, "Whether focus is shifted ..."
5, MS-IME automatic activation test, "Whether MS-IME is set ..."
6, #0080_IME
3, Form print test, " Form printing is tested."
3, Irregular job test, "Operation tests on irregular operations are ..."
4, #0090_IN_ERR
4. Window screen switching test, " "
4, Abnormal termination test, "Test of causing abnormal ..."
4, Master inconsistency test, " "
4, Zero division test, " "
3, Other test, "Other test required is carried out."
4, GDI resource status check test, " "
4, Development standardization conformity test, " "
2, Build testing, "Execution modules are tested module by module."
2, Performance test, "Performance test is performed."
2, Stress test, "Load test is performed."
2, Volume test, "Test is performed by means of mass data."
2, Operating environment test, "Test is performed in a real ..."

FIG. 13

| GENERATION PATTERN NAME | DESCRIPTION |
|---|---|
| #0010_PG | TEST ITEMS ARE GENERATED UNDER A SPECIFIED PROGRAM NAME |
| #0020_FORM | ALL FORM NAMES OF FORMS CONNECTING BETWEEN PROGRAMS ARE GENERATED (#0030 TO #0080 ARE GENERATED AT A LOWER LEVEL) |
| #0030_ACTION | TEST ITEMS RELATED TO ACTIONS OF EACH GROUP ARE GENERATED FOR EACH FORM |
| #0040_IN_ITEM | TEST ITEMS RELATED TO INPUT ITEMS ARE GENERATED FOR EACH FORM |
| #0050_OUT_ITEM | TEST ITEMS RELATED TO OUTPUT ITEMS ARE GENERATED FOR EACH FORM |
| #0070_DETAILS_CONTROL | DETAIL-TYPE ITEMS ARE GENERATED FOR EACH FORM |
| #0080_IME | TEST ITEMS RELATED TO INPUT ITEMS IN IME MODE ARE GENERATED FOR EACH FORM |
| #0090_IN_ERR | ERROR INPUT TEST ITEMS RELATED TO INPUT ITEMS OF ALL FORMS ARE GENERATED |
| #1010_SUBSYSTEM | TEST ITEMS ARE GENERATED UNDER A SUBSYSTEM NAME |

FIG. 14

STANDARD TEST ITEM INI FILE

[ACTION]
GRP=
1, Item check, "Whether items are checked according to the design plan is tested."
1, Group transition, %GROUP & "Transition to group"

DBU=
1, Database update, "Whether database is updated according to the design plan is tested."
1, Group transition, %GROUP & "Transition to group"

BFR=
1, First page, "Whether an error message is displayed without a scrolling operation when the first page is ..."

NXT=
1, Last line end display, "Whether an error message is displayed without a scrolling operation when there is ..."
1, Last line display, "Whether scrolling is possible when there is displayed (input) data in the last line."

FRM=
1, Display of other forms, %FORMNM & "Whether (" & %FORM ID &") form is displayed is tested."
1, Display type, "Whether display of the present form disappears when another form is displayed."

FIG. 15

[#1010_SUBSYSTEM]
TEST SPECIFICATION

REQUIREMENT,1.00,"Created by SQA Requirement Export on 10/26/97 11:08:31"
1, Received order subsystem –JYU–, "The whole received order subsystem is tested."
1, Purchase order subsystem –HTY–, "The whole purchase order subsystem is tested."
1, Purchase subsystem –KBI–, "The whole purchase subsystem is tested."
1, Cost price subsystem –GNK–, "The whole cost price subsystem is tested."
1, Personnel affairs subsystem –JNJ–, "The whole personnel affairs subsystem is tested."
1, Connection test, " "
2, Connection test between subsystems, " "
2, Connection test between systems, " "
1, System testing, " "
2, Multiuser test, " "
2, Performance test, "

FIG. 17

[#0030_ACTION]

DESIGNATED PROGRAM NAME : JYU01OVE
RELEVANT FORMS : JYU01O01(FORM INDEX = 1),
JYU01O03(=24)

↓ SEARCH

DESIGN INFORMATION
TABLE : GROUP ACTION LIST

| FORM INDEX | GROUP ID | ACTION ID | ACTION TYPE |
|---|---|---|---|
| 1 | 0 | SUB | ETC |
| 1 | 0 | NEW | ETC |
| 1 | 0 | UPD | ETC |
| 1 | 0 | DLT | ETC |
| 1 | 0 | FIN | END |
| 1 | 0 | ENT | GRP |
| 1 | 0 | JSS | FRM |

TABLE : GROUP ID MASTER

| GROUP ID | GROUP | GROUP CONSTANT |
|---|---|---|
| 0 | MODES RELATED TO DATA-PROCESSING SECTIONS, ETC. | F_MODE |

TABLE : ACTION DEFINITION LIST

| ACTION NAME | ACTION ID | PF KEY | NAME | MEANING |
|---|---|---|---|---|
| INQUIRY SUB | SUB | F01 | INQUIRY SUB | INQUIRY SUB MENU |

↓ LOAD ACTIONS OF ALL GROUPS (LOAD STANDARD TEST ITEMS AS WELL)

TEST SPECIFICATION

5, Action test -Group Action-, "QuiQpro-related push button ..."

6, MODE group test, "Actions in MODE group are tested."

7, Inquiry sub, "Inquiry sub of Taskaru button click, function key ..."

⋮

7, Completion of entry, "Completion of entry of Taskaru button click, function key ..."

8, Item check, "Whether check is performed according to the design plan."

8, Group transition, "Transition to HEAD_KEY group"

[#0080_IME]

DESIGNATED PROGRAM NAME : JYU01OVE
RELEVANT FORMS : JYU01001
JYU01003

DESIGN INFORMATION
TABLE : INPUT-OUTPUT INFORMATION DEFINITION LIST

↓ SEARCH

| FORM ID | LEVEL | ITEM NAME | TYPE | IME |
|---|---|---|---|---|
| JYU01001 | | CODE OF PERSON IN CHARGE | TXT | 2 |
| JYU01001 | | NAME OF PERSON IN CHARGE | LBL | 0 |
| JYU01001 | | SLIP REMARK | TXT | 4 |
| JYU01001 | | ENTER 01 POINT | BTN | 0 |
| JYU01001 | M | DETAIL SELECTION CHECK BOX | CHK | 0 |
| JYU01001 | M | DETAIL NUMBER | LBL | 0 |

IME MODE VALUES OF VISUAL BASIC

```
0 NO VALUE: IME IS UNDER MANAGEMENT OF WINDOWS.
1 ON: TURN ON IME IN ENTRY MODE SET LAST TIME.
2 OFF: TURN OFF IME.
3 FIXED OFF: INHIBIT THE USE OF IME IN DEALING WITH THIS OBJECT.
4 FULL SIZE HIRAGANA CHARACTERS: TURN ON IME
        IN FULL SIZE HIRAGANA CHARACTER ENTRY MODE.
5 FULL SIZE KATAKANA CHARACTERS: TURN ON IME
        IN FULL SIZE KATAKANA CHARACTER ENTRY MODE.
6 HALF SIZE KATAKANA CHARACTERS: TURN ON IME
        IN HALF SIZE KATAKANA CHARACTER ENTRY MODE.
7 FULL SIZE ALPHANUMERIC CHARACTERS: TURN ON IME
        IN FULL SIZE ALPHANUMERIC CHARACTER ENTRY MODE.
8 HALF SIZE ALPHANUMERIC CHARACTERS: TURN ON IME
        IN HALF SIZE ALPHANUMERIC CHARACTER ENTRY MODE.
```

↓ LOAD ALL ITEMS OF INPUT
TYPE (TXT, CMB, CHK, etc.)

TEST SPECIFICATION

6, Code of person in charge (Off), "Whether entry of Code of person in charge
    is set to Off mode of MS-IME ..."
6, Slip remark (Full size hiragana characters), "Whether entry of Slip remark is
    set to Full size hiragana characters entry mode of MS-IME."
6, Detail fields, "Each detail field is tested."
7, Detail selection check box (), "Whether entry of Detail selection check box ..."
⋮

FIG. 25

TEST SPECIFICATION GENERATION SYSTEM AND STORAGE MEDIUM STORING A TEST SPECIFICATION GENERATION PROGRAM

BACKGROUND OF THE INVENTION

1. Field of the Invention

The present invention relates to a test specification generation system, and more particularly to a test specification generation system which is capable of generating a test specification required for testing an application program in development of a computer software system, based on design information of the system.

2. Description of the Related Art

The development process of a business software system includes a design process, a production process, and a testing process.

In the design process, client's demands of a system to be developed are analyzed, and elements of the system that can be systematized are determined to generate a design specification of the system. In the design process, a CASE (computer-aided software engineering) tool is utilized. In the production process, programming of an application program implementing the system is carried out according to the design specification generated in the design process, and in the testing process, it is checked whether the application program operates as intended in the design specification. A test specification is a document prepared to specify indexes/instructions for testing the application program.

In development of business software systems, the testing process is no less essential than the design process and the production process, and increasing importance is attached to the testing process to ensure further improved quality and reliability of the system. In this context, automatization of the testing process is contemplated. If the testing process is automatized to a certain extent, it is possible to further enhance productivity of the system development process. Today, there exist testing tools which are capable of providing such a testing environment that will contribute to automization of the testing process. A typical known testing tool of this kind, for instance, is "SQA suite (registered trademark of SQA Inc. in the United States)".

This tool manages a whole sequence of software testing processes from test planning/design to generation of a report on test results. To manage the whole test sequence, it is necessary to input test information required for the management into the tool at the outset. The test information includes a test plan, test items, and so forth. These test information items are stored in a database where they are under single point management as information necessary for operations in the testing process. The test specification is generated based on the test information.

As described above, in the testing process, it is always required to enter test information items to generate a test specification. On the other hand, so long as the CASE tool is used in the design process, the design information is under single point management in a design information repository. The design information, which is entered in the design process, includes items of test information, such as test items, which are referred to in the testing process, as well. This means that the same kind of information that is entered in the design process is entered again in the testing process, which results in degradation of operational efficiency and productivity of the software development process.

SUMMARY OF THE INVENTION

It is an object of the invention to provide a test specification generation system which is capable of generating a test specification for use in a testing process from a repository of design information entered during a design process.

To attain the above object, there is provided a test specification generation system for generating a test specification based on design information. This test specification generation system is characterized by comprising test configuration storage means for storing a test configuration file describing a fundamental configuration of the test specification, design information reading means for reading design information generated in a design process, data analysis means for reading statements written in the test configuration file, line by line, for analysis to determine whether a read statement line is a fixed output line or a program output line, first test item generation means for generating a test item from the design information read by the design information reading means, when the data analysis means determines that the read statement line is a program output line, and test specification writing means for outputting each statement line determined by the data analysis means to be a fixed output line and the test item generated by the first test item generation means.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 6 is a diagram showing an example of a subsystem list of the design information;

FIG. 7 is a diagram showing an example of a program list;

FIG. 8 is a diagram showing an example of a screen list;

FIG. 9 is a diagram showing an example of an action list;

FIG. 10 is a diagram showing an example of an input-output information definition list;

FIG. 11 is a diagram showing an example of an action detail definition list of input-output information;

FIG. 12 is a diagram showing an example of a subsystem version of a test configuration INI file;

FIG. 13 is a diagram showing an example of a program version of the test configuration INI file;

FIG. 14 is a diagram showing an example of a generation pattern name list;

FIG. 15 is a diagram showing an example of a standard test item INI file;

FIG. 17 is a diagram which is useful in explaining manner of generation of "subsystem" test items;

FIG. 21 is a diagram which is useful in explaining a manner of generation of test items related to actions;

FIG. 25 is a diagram which is useful in explaining a manner of generation of test items related to input items in IME mode;

DESCRIPTION OF THE PREFERRED EMBODIMENT

The present invention will now be described with reference to the accompanying drawings.

Figure 1:
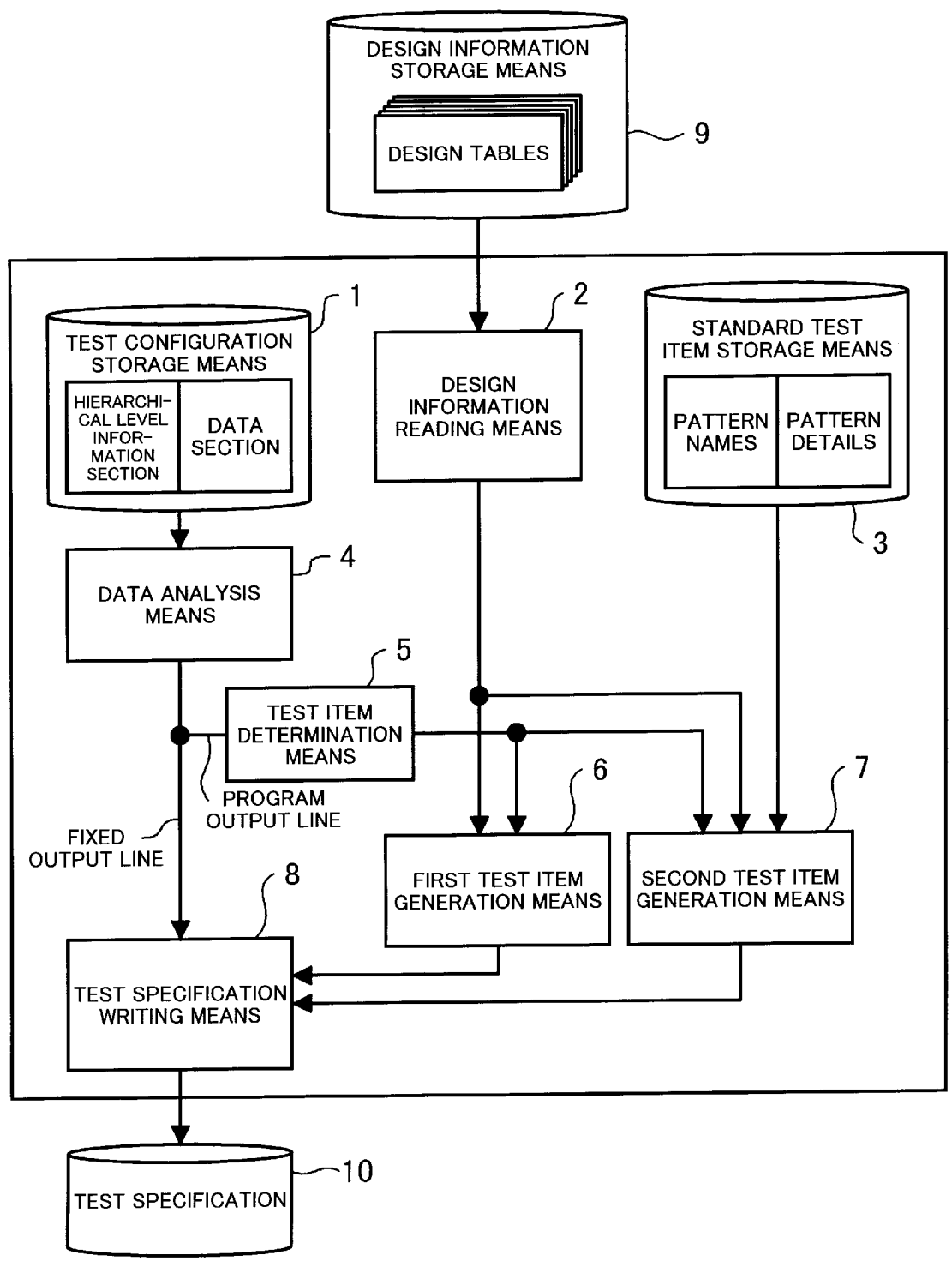
FIG. 1 is a conceptual presentation showing principles of the present invention.

First, the outline of the present invention will be described below with reference to FIG. 1 illustrating the principles of the invention. A test specification generation system according to the invention includes test configuration storage means 1 for storing a test configuration file which defines an outline of testing to be specified by a test specification, design information reading means 2 for reading design information generated in a design process, standard test item storage means 3 for storing a standard test item file which defines details of test items which the test configuration file cannot cover, data analysis means 4 for reading lines of description of the test configuration file, line by line, for analysis to thereby determine whether the line is a fixed output line or a program output line, test item determination means 5 for determining whether generation of a test item requires only the design information generated in the design process or not only the design information but also standard test items in the standard test item file when the line read by the data analysis means 4 is a program output line, first test item generation means 6 for generating test items based on the design information generated in the design process, second test item generation means 7 for generating test items based on the design information and standard test items in the standard test item file, and test specification writing means 8 for outputting lines which are determined to be fixed output lines by the data analysis means 4 and test items generated by the first and second test item generation means 6 and 7.

The design information generated in the design process is stored in design information storage means 9 as a plurality of design tables. The test configuration file stored in the test configuration storage means 1 as a prototype test specification file has lines each comprised of a hierarchical level information section and a data section. The standard test item file stored in the standard test item storage means 3 contains pattern names and information describing pattern details. The standard test item file is used according to instructions set forth in the test configuration file.

When a test specification is generated by the test specification generation system, the data analysis means 4 reads test specification statements set forth in the test configuration file stored in the test configuration storage means 1, line by line, at the outset. Then, the data analysis means 4 analyzes the content of the data section of each line to determine whether the line is a fixed output line having a data section whose content should be outputted as it is or a program output line based on which the present program should prepare output data. If the data analysis means 4 determines that the line is a fixed output line, the test specification writing means 8 writes the content of the data section of the line together with the level information of the same line into a test specification 10. On the other hand, if the data analysis means 4 determines that the line is a program output line, the test item determination means 5 determines from a pattern name specified in the program output line whether the line belongs to a first pattern which requires design information of the design tables stored within the design information storage means 9 alone to generate a test item or a second pattern which requires not only design information in the design tables but also information described in the pattern details of the standard test item file to generate a test item. When it is determined that a line belongs to the first pattern, the first test item generation means 6 obtains information required for generation of a test item from the design tables within the design information storage means 9 through operation of the design information reading means 2, processes the obtained information, adds corresponding level information thereto, and then delivers the processed information to the test specification writing means 8. On the other hand, when it is determined that a line belongs to the second pattern, the second test item generation means 7 obtains information required for generation of a test item from the design tables, similarly to the first pattern. In this case, if it is required to generate a further detailed test item, the second test item generation means 7 obtains a pattern detail corresponding to the pattern name of the line from the standard test item file within the standard test item storage means 3, processes the design information and the pattern detail, and then delivers the processed design information and pattern detail to the test specification writing means 8. The test specification writing means 8 outputs fixed output lines received from the data analysis means 4 and test items generated by the first and second test item generation means 6 and 7 into a file of the test specification 10, line by line.

Thus, a test specification which inherits design information generated in the design process can be prepared based on the test configuration file which serves as a general setting that defines a general test sequence and the standard test item file designated in the test configuration file which serves as a details setting for defining test details. This makes it possible to omit manual operations for entry of test information required in the testing process for generation of test items, and thereby enhance productivity of the software system development process.

Next, an embodiment of the present invention will be described which is applied to a computer for used in developing an application program of a received order input system.

Figure 2:
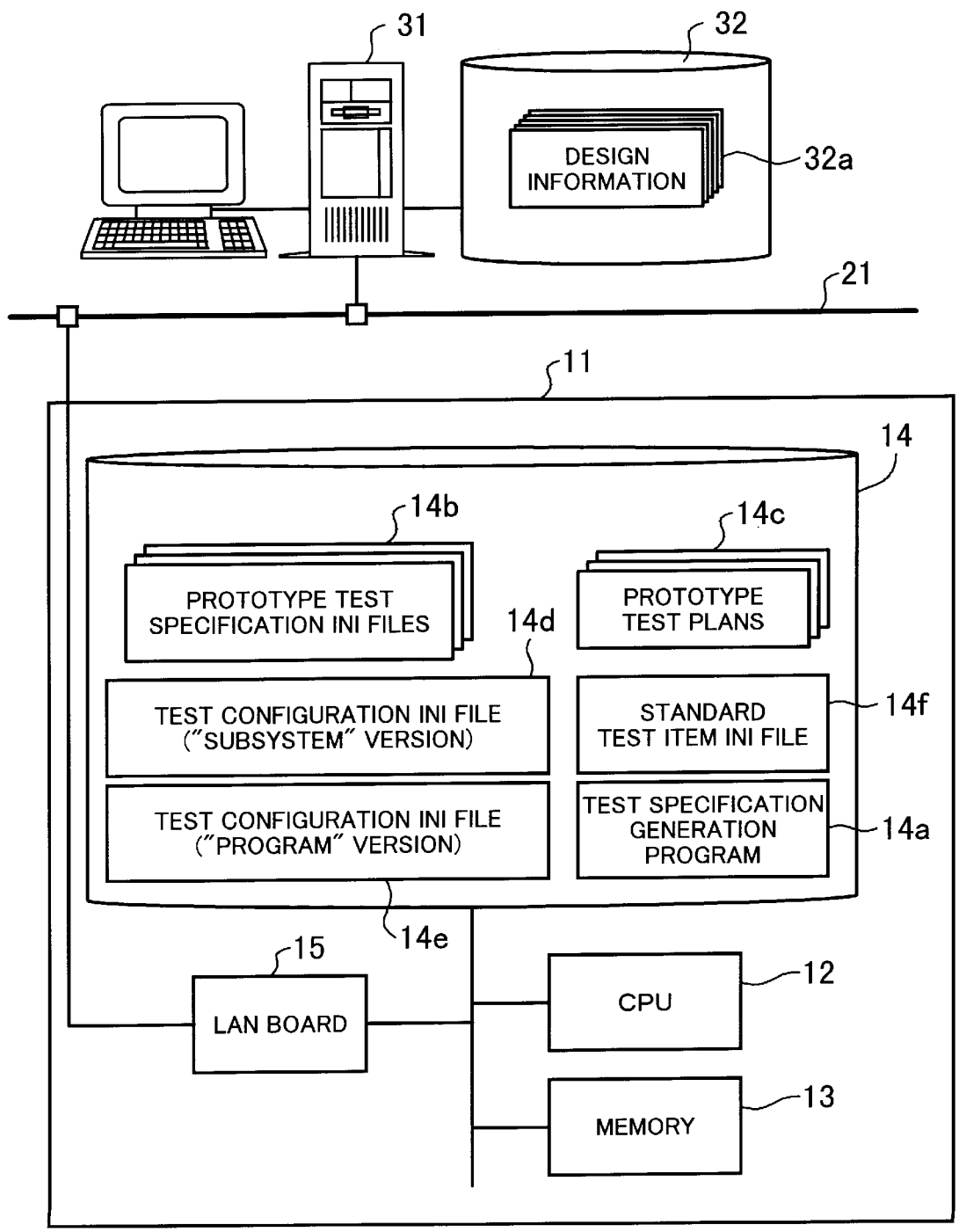
FIG. 2 is a block diagram showing a whole system configuration for implementing a system that generates a test specification from design information.

FIG. 2 shows a whole system configuration for realizing a test specification generation system that generates a test specification from design information. The test specification generation system according to the embodiment is implemented e.g. by installing a test specification generation program 14a on a personal computer 11. The personal computer 11 includes a central processing unit (CPU) 12, a memory 13, a hard disk 14, and a local area network (LAN)

board 15. The hard disk 14 stores the test specification generation program 14a, prototype test specification INI files 14b and prototype test plans 14c, all of which are provided in advance together with the test specification generation program 14a, test configuration INI files 14d, 14e obtained by customizing one of the prototype test specification INI files 14b according to a software development project, and a standard test item INI file 14f. Further, the personal computer 11 is connected to a network 21 by the LAN board 15. The network 21 has a computer 31 connected thereto, which is used for carrying out a design process. The computer 31 is provided with a hard disk 32 which serves as an external storage device. Design information 32a generated in the design process is stored in the hard disk 32 as tables under repository management.

To generate the test specification, the test specification generation program 14a is loaded into the memory 13 and executed by the CPU 12. Prior to describing the operation of the test specification generation program 14a, a general sequence of operations of the testing process will be described.

Figure 3:
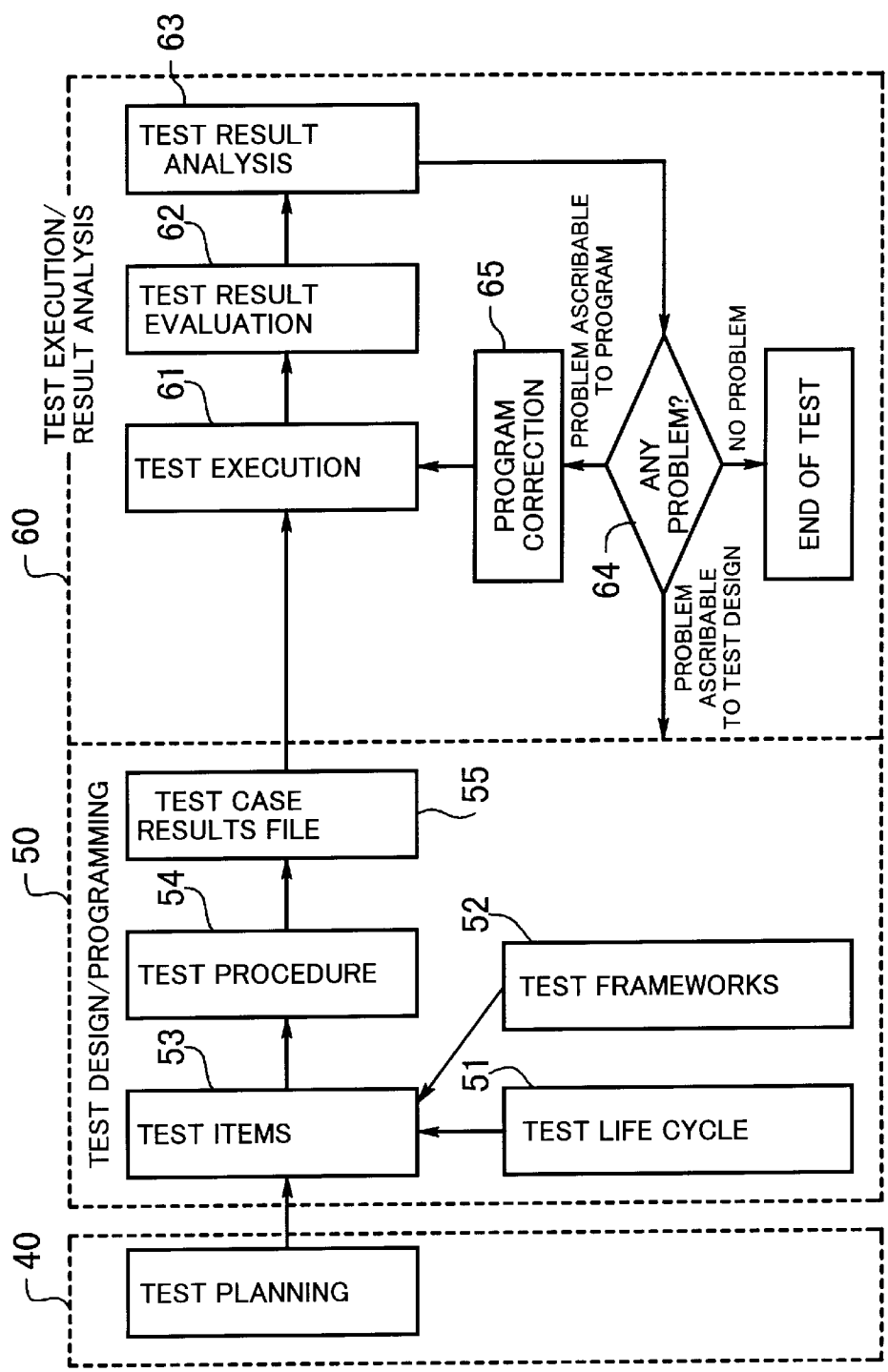
FIG. 3 is a diagram showing an outline of the hole procedure of a testing process.

FIG. 3 schematically shows the whole procedure of the testing process. The testing process is largely divided into a test planning stage 40, a test design/programming stage 50, and a test execution/result analysis stage 60.

In the test planning stage 40, a test plan is prepared. The test plan contains the objectives of testing the application program, a criterion for judgment on completion of the testing, a testing procedure, task assignment, performance goals, quality control indexes, a schedule, and so forth.

In the test design/programming stage 50, a test life cycle 51 is prepared at the outset. The test life cycle 51 is divided according to the objectives of the testing into four phases: unit testing, build testing, integration testing, and system testing. In the unit testing, programs are each tested as a unit. In the build testing, program internal screens and functions of the programs in association with the screens are tested. In the integration testing, consistency between programs, between subsystems, and between systems is tested. In the system testing, a performance test, a multi-user (multiprocessing) test, a load test concerning resources such as memory and a disk, a load test by using a large volume of data, checks on functions of the whole system, etc. are performed. Then, test frameworks 52 are prepared for the respective phases of the test life cycle according to the objectives of tests including a business capability test for testing business capabilities, a user interface test for testing a graphical user interface (GUI), a field check test for testing input-output fields in each program internal screen, a transaction test for testing update of database, a form print test for testing printing of forms, an irregular job test for testing irregular job processing, and so forth. Then, what kind of test should be actually performed on each program or screen is determined to make test requirements specific to each test. The test requirements are hierarchically classified in the test framework of each phase of the test life cycle as test items 53 whereby a test specification is generated. Next, a test procedure manual 54 is prepared which specifies on what basis (e.g. screen-by-screen basis, operation-by-operation basis, etc.) and in what procedure a test should be performed. Further, a test case results file 55 is prepared to describe results that should be obtained when each test is carried out according to test requirements thereof.

In the following test execution/result analysis stage 60, testing (61) of the application program is carried out based on the test specification, the test procedure manual, and the test case results file, which are generated in the test design/programming stage 50, and the results of the testing are evaluated (62) and analyzed (63). If the result analysis finds a problem, it is determined whether the problem is ascribable to the application program or the test design (64). When the problem is ascribable to the application program, the system development process returns to the production stage so as to correct the application program for a retest (65). On the other hand, when the problem is ascribable to the test design, the system development process returns to the test design/programming stage 50 so as to correct the test specification for a retest.

Now, an outline of overall process of development of a software system will be described for clarity of description of the present invention.

Figure 4:
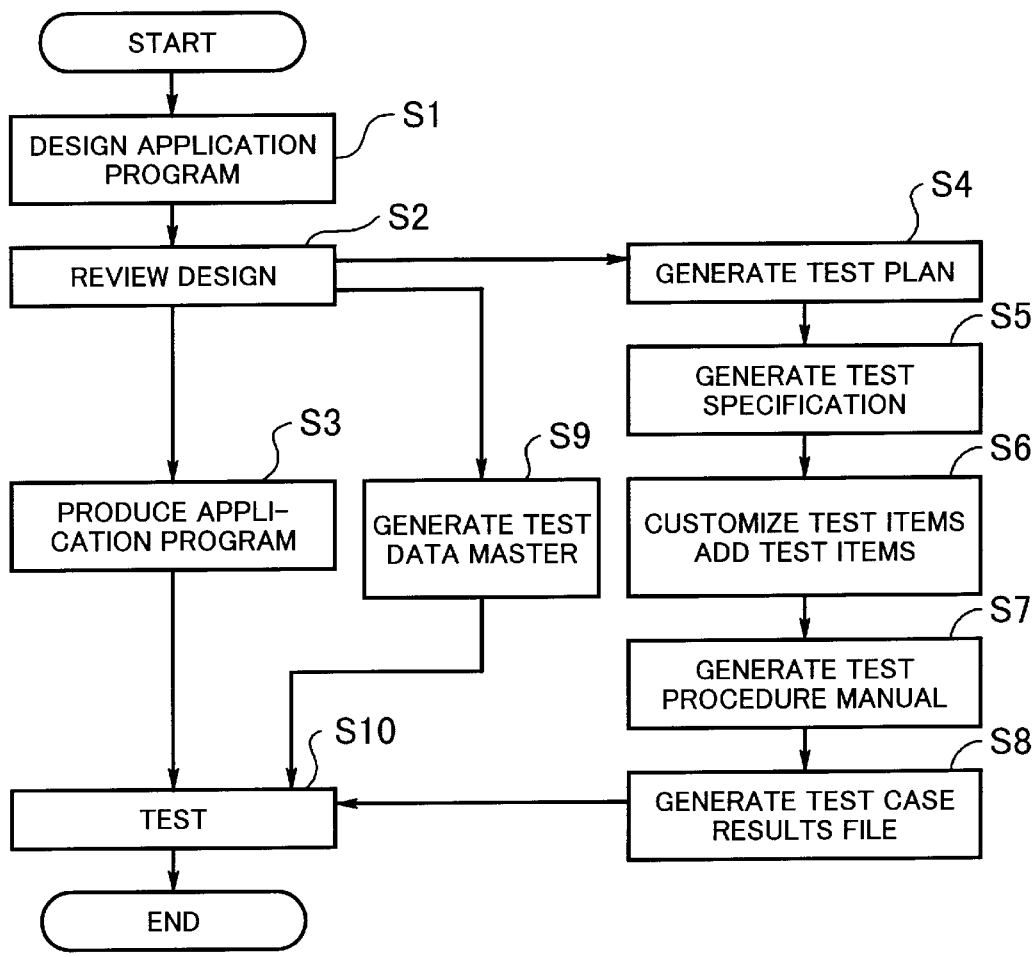
FIG. 4 is a flowchart showing an overall process of development of a software system.

FIG. 4 schematically shows the outline of the overall process of the software system development. First, an application program for a system is designed at the design stage (step S1), and a design review is made so as to check on a screen layout based on information of the design (step S2). If the review of the design is favorable, the application program is produced based on the design specification (step S3). In parallel with the production of the application program, a test plan is prepared based on the design information (step S4), and then a test specification is generated (step S5). The steps S4 and S5 are carried out by the test specification generation program 14a. Next, test items in the test specification generated by the test specification generation program 14a are customized, and required test items are added thereto, whereby preparation of the test specification is completed (step S6). Thereafter, a procedure manual is prepared (step S7), and a test case results file is created (step S8). Further, a test data master required for actually carrying out testing by using the prepared test specification is also created (step S9). Finally, the application program is tested (step S10) according to the test specification by using test data.

Next, an outline of processing carried out by the test specification generation program 14a will be described.

Figure 5:
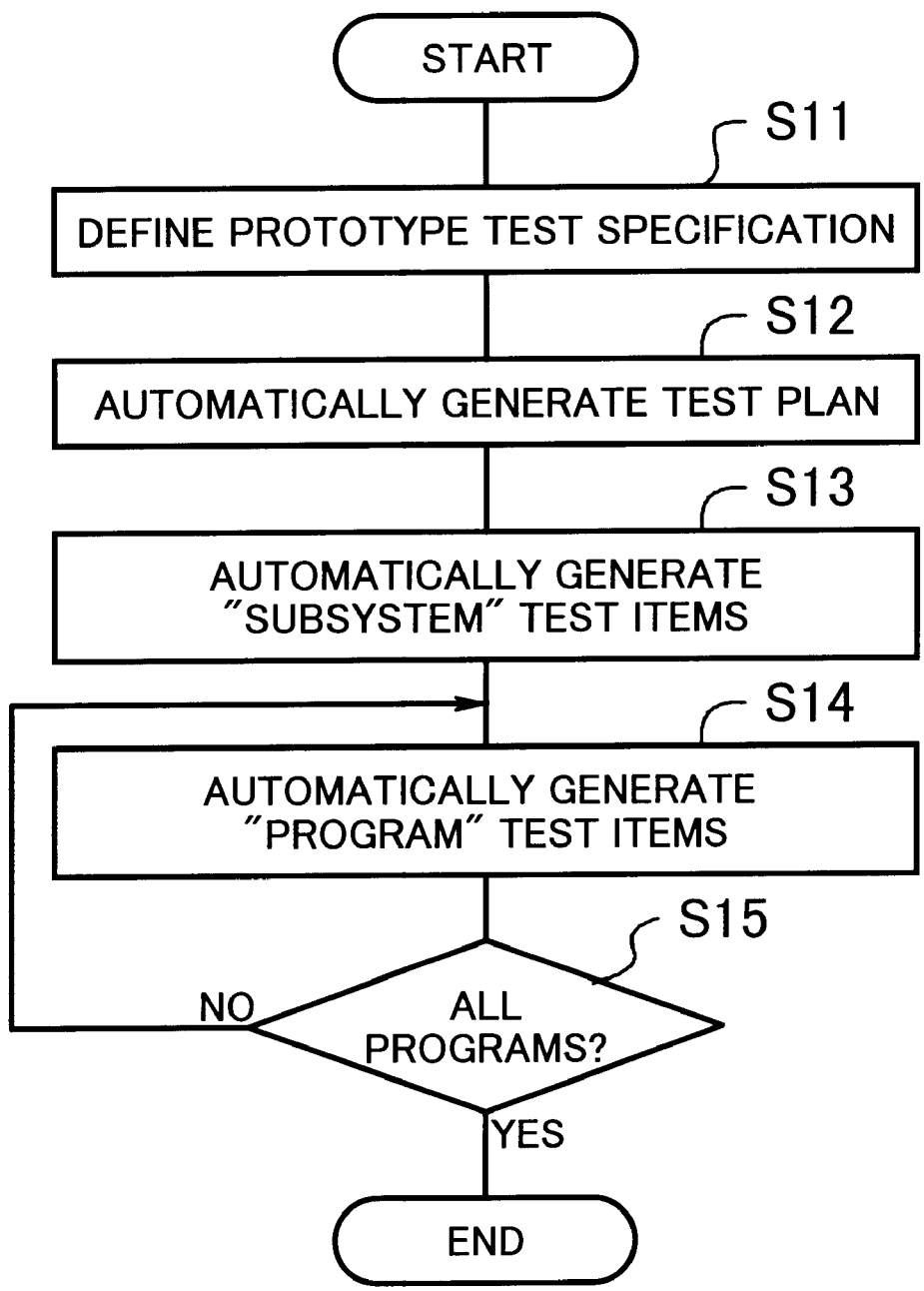
FIG. 5 is a flowchart showing a process for generation of a test specification.

FIG. 5 shows a process for generation of a test specification, which is carried out by the test specification generation program 14a. First, a prototype test specification is defined (step S11). More specifically, one of the prototype test specification INI files 14b is selected and the selected file is customized to the characteristics of the development project to generate test configuration INI files 14d, 14e, and at the same time, a standard test item INI file 14f is generated in a manner adapted to the characteristics of the project. When no modification is required, the selected prototype test specification INI file 14b can be used as it is. Then, a test plan is automatically generated (step S12). The test plan is a word-processed document specifying the objectives of the testing of the application program and defining contents of the same. A sample of this document is provided in advance as the prototype test plan 14c, so that the test plan can be automatically generated by copying the prototype test plan 14c. Next, "subsystem" test items are automatically generated (step S13), and "program" test items are automatically generated (step S14). At the following step, it is determined whether or not generation of test items covering the whole application program is completed(S15). If the generation is not completed, the present program returns to the step S14. If all the test items concerning the programs are completely generated, the present program for generating the test specification is terminated. In general, an application program forms a three-level hierarchy such that a system at the top level is divided into subsystems, and each subsystem includes programs (program modules) as smallest units. An actual testing operation is carried out program by program, so that it is required to generate a test specification for each program, and hence the test specification generation program 14a is provided with capability of generating test items for each program (program module). The test items generated for programs (program modules) under a subsystem can be integrated into a test specification for the subsystem. Therefore, the test specification is generated by first writing only the names of all the subsystems first, and then adding the test items generated for each program to the test specification under the name of a corresponding subsystem. Generation of one "subsystem" test item, i.e. the name thereof can be effected by one operation, but it is required to carry out generation of test items a plurality of times corresponding to the number of programs included in the subsystem since each subsystem is comprised of a plurality of programs.

Now, design information required for test item generation will be described before an example of generation of test items is described. The design information includes a subsystem list, a program list, a screen list, an action list, an input-output information definition list, and an action detail definition list. These design information lists are stored in the hard disk 32 as design information 32a of tables. Examples of these design information lists will be shown below.

FIG. 6 shows an example of the subsystem list. The subsystem list 71 is a table used for collectively managing information concerning the subsystem names. The table is comprised of subsystem number (No.) fields, subsystem identifier (ID) fields, and subsystem name (NAME) fields. The illustrated example indicates that five subsystems are designed.

FIG. 7 shows an example of the program list. The program list 72 is a table comprised of program number (No.) fields, program ID fields, program name fields, and type fields. The illustrated example is a program list for a received order subsystem which has a subsystem ID of JYU. The received order subsystem is comprised of nine programs, as enumerated therein.

FIG. 8 shows an example of the screen list. The screen list 73 is comprised of screen number (No.) fields, form ID fields, form name fields, and type fields. The illustrated example contains eleven forms of screens generated for use in the received order subsystem.

FIG. 9 shows an example of the action list. The action list 74 is a table used for collectively managing information on buttons (or function keys) defined for the various forms of screens. The table is comprised of action name fields, action ID fields, function key (PF key) fields, and name fields.

FIG. 10 shows an example of the input-output information definition list. The input-output information definition list 75 is a table used for collectively managing information of attributes on items in each screen. The input-output information definition list 75 includes item number (No.) fields, item name fields, group (G) fields, level (L) fields, type fields, attribute fields, digit number fields, decimal place number fields, maximum length fields, format fields, automatic tab (T) fields, input method editor (IME) mode (I) fields, essential input fields, automatic code (C) fields, code ID fields, and displayed item name fields. In the table shown in FIG. 10, the form ID is "JYU01001", which means that the table is a list of detailed attribute information on items appearing on a received order input screen (no section). For instance, the table gives detailed information on an area of "Received order number" such that the area has a digit attribute and is comprised of six digits. Items appearing on the received order input screen are grouped into three logical groups, i.e. a head group, a body group, and a tail group. The group field (G) gives information on which of the three logical groups an item belongs to. In the type field, there is shown an attribute "text" indicative of a type of an item which can be not only displayed but also entered, an attribute "label" indicative of a type of an item which can be displayed, but not entered, and so forth.

FIG. 11 shows an example of the action detail definition list. The action detail definition list defines in detail buttons or function keys for depression in each screen defined in detail by the input-output information definition list 75 under each group. In the illustrated example, under Group 0 which is logically classified as "key group for switching between modes, such as those related to respective data-processing sections", PF keys F01, F05, F06, F07, F10, and F12 are defined as function keys which can be depressed. Further, each action which is taken when a specific PF key is depressed is defined in detail by an action ID, an action name, an action type, and action information. For instance, in the case of F03 in Group 1, its action type is specified as "FRM" indicative of form switching action, and hence the defined action to be taken in response to depression of the function key F03 is that the present screen should be switched to a screen identified by form ID=JYU01003.

The test specification is generated based on the design information described above, according to the procedure shown in FIG. 5. First, the test configuration INI files 14d, 14e are created by customizing the selected prototype test specification INI file 14b to the characteristics of the development project. An example of generation of these files will be described below.

FIG. 12 shows an example of definition of the "ubsystem" version 14d of the test configuration INI file. Now, the file format of this test configuration INI file will be described. The first line of the test configuration INI file is a control line for the file, and hence the modification of this line is prohibited. Lines subsequent to the control line can be customized to meet the development project. The second line, which is a program output line, is separated into two sections by a delimiter ", ". In the first section of the second line is written a level number, while in the second section is written a generation pattern name composed of control characters including # and a title. Fixed output lines of the third line and lines subsequent thereto are each separated into three sections by identical delimiters. Each of these lines has a level number described in the first section, a test specification title in the second section thereof, and test specification details in the third section thereof.

FIG. 13 shows an example of the "program" version 14e of the test configuration INI file. In the illustrated example, the first line, which is a control line, includes a file name (of a standard test item INI file) as a parameter, thereby indicating that the standard test item INI file having the name should be used for generation of the test specification. The second line provides an instruction for generation of a program name. The third line is a fixed output line instructing that description of the second section should be outputted as it is at a hierarchical level immediately below that of the second line. In each line thereafter, an instruction for a fixed output line or a program output line is provided together with a hierarchical level designation in the first section. Now, a generation pattern name of each program output line in which the second section starts with "#" will be explained.

FIG. 14 shows a list of generation pattern names. In this list, "#0010_PG" represents an instruction for generating a program name, "#0020_FORM" an instruction for generating a form name, "#0030_ACTION" an instruction for generating a test item related to an action, "#0040_ITEM" an instruction for generating a test item related to an input field, "#0050_OUT_ITEM" an instruction for generating a test item related to a display field, "#0070_DETAILS_CONTROL" an instruction for generating a detail test item, "#0080_IME" an instruction for generating an IME mode test item, "#0090_IN_ERR" an instruction for generating an error input test item, and "#1010_SUBSYSTEM" an instruction for generating test items under a subsystem name by using the "subsystem" version of the test configuration INI file.

FIG. 15 shows an example of definition of the standard test item INI file. The standard test item INI file is a file describing detailed setting for ones of generation patterns, which allows further detailed setting. This file is customized to the characteristics of the project. The file format of this file includes "[pattern name]" and "pattern detail=" defined as a branch condition or detailed setting thereof. In the illustrated example, he "[pattern name]" shows that detailed setting should be performed for ACTION which is designated as a generation pattern name in part of the test configuration INI file shown in FIG. 13, while the "pattern detail=" in this example sets detailed setting for each of the actions of a group transition (GRP), a database update (DBU), a preceding page (BFR), and a next page (NXT).

Next, the process of generation of the test specification based on the tables of the design information, the test item INI files, and the standard test item INI file will be described. First, generation of a heading line of the test specification is explained.

Figure 16:
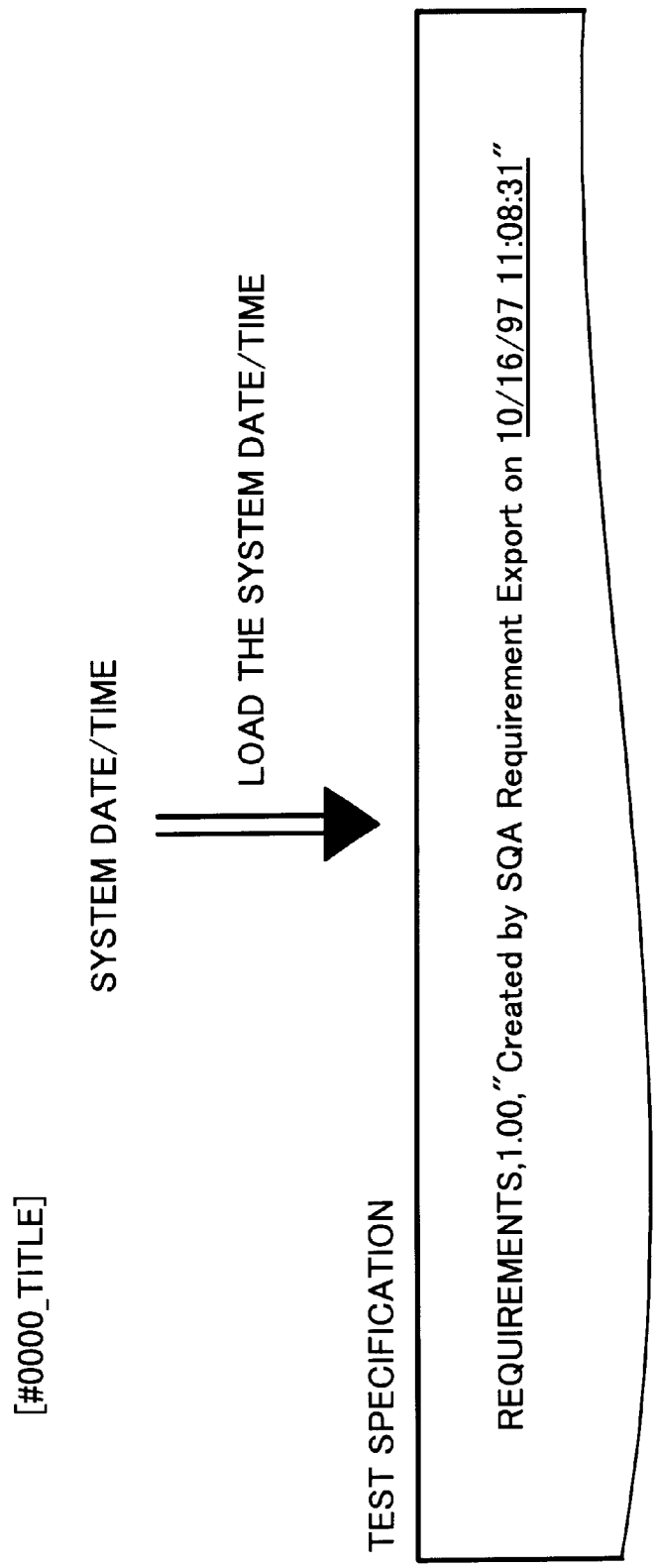
FIG. 16 is a diagram which is useful in explaining manner of generation of a heading line of the test specification.

FIG. 16 illustrates a manner of generation of the heading line of the test specification. When the test specification is generated in the format of the above-mentioned test tool "SQA suite", system date/time is obtained from the personal computer and a single line only containing the system date/time is written in the test specification.

FIG. 17 illustrates a manner of generation of "subsystem" test items. The "subsystem" test items are generated simply by loading the subsystem ID's and names of all the items specified in one of the tables of the design information, i.e. the subsystem list 71 shown in FIG. 6, to write them in the test specification. After all the items in the subsystem list 71 have been loaded, fixed output lines written in the test configuration INI file are written in the test specification as test items.

Thus, the framework of the specification for testing the subsystems is prepared. Next, portions of the test specification related to programs included in each subsystem are generated from the "program" version of the test configuration INI file, and then each added after the description of a corresponding subsystem in a nested fashion. For instance, at the line following a line "Received order subsystem" is additionally written a test item generated for a program having a program name "Received order input (no section)", and so forth. Then, after a test item generated for a program having a program name "Received order input (mock-up)" is added, test items related to the programs of the following "Purchase order subsystem" are generated and added below a line "Purchase order subsystem".

Figure 18:
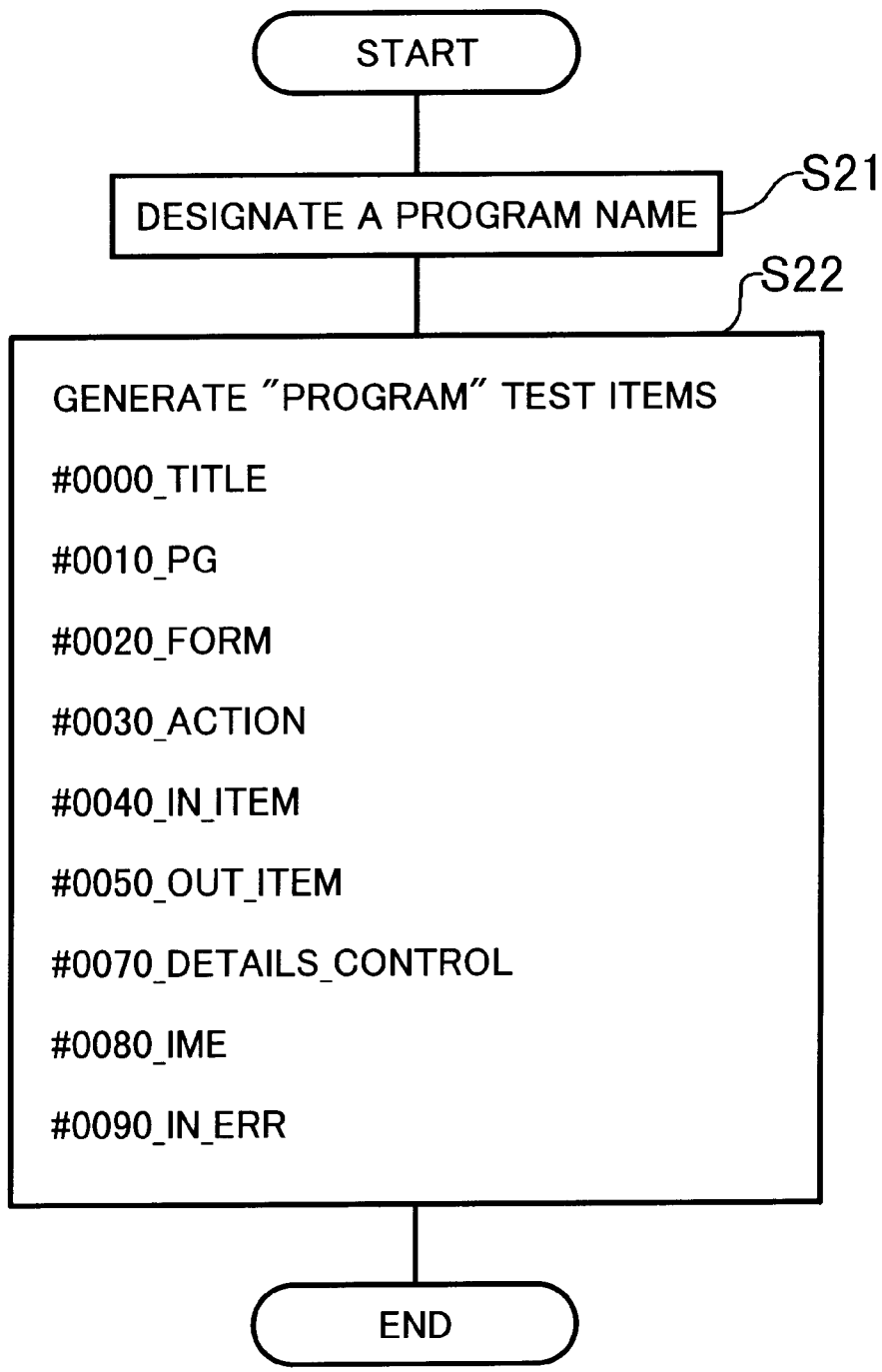
FIG. 18 is a flowchart showing a process for generation of "program" test items.

FIG. 18 shows a process for generating "program" test items. In the process of generation of test items for each program, a program name is designated at the outset (step S21), the tables of the design information associated with the program name are searched, for information required for generation of the test specification, and then the obtained information is written in the test specification as test items (step S22). Now, a manner of test item generation for program output lines carried out at the step S22 will be described, pattern by pattern, in detail.

Figure 19:
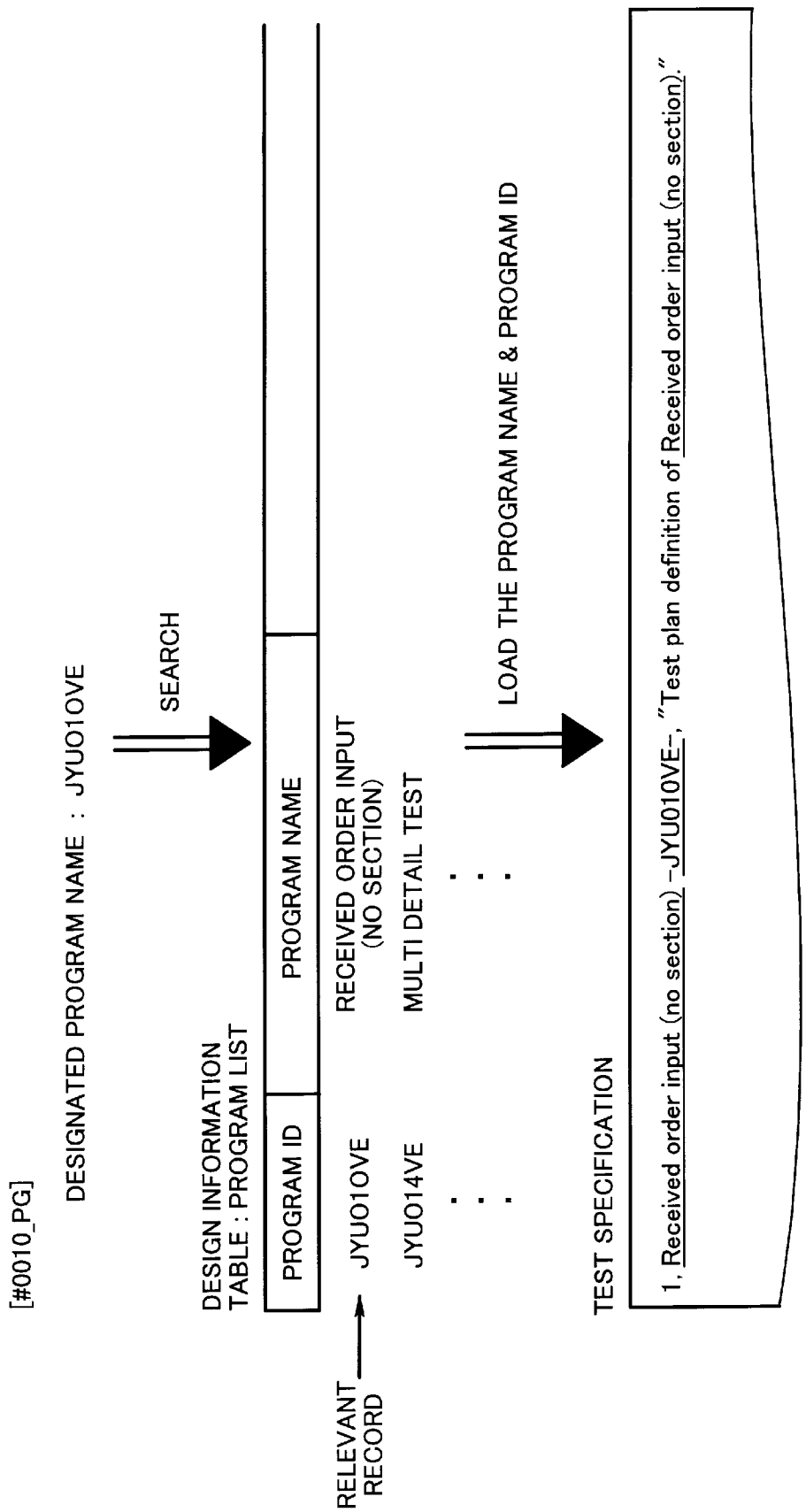
FIG. 19 is a diagram which is useful in explaining manner of generation of test items containing program games.

FIG. 19 illustrates a manner of generation of the test item of a program name. Under the generation pattern name "#0010_PG", on an entry screen for entering the name of a program for which part of the test specification is to be created, the program "Received order input (no section)", for instance, is designated by using a corresponding program ID "JYU010VE". Then, the table of the program list in the design information (see FIG. 7) is searched by using the program ID as a key. As a result of the search, the first record on the list is found to be a relevant one and retrieved to obtain the program name. The obtained program name "Received order input (no section)" and the program ID designated at the outset are processed and loaded in the test specification. More specifically, the program name and the program ID are processed to be arranged as shown at underlined portions of the illustrated part of the test specification, and written in the file of the test specification.

Figure 20:
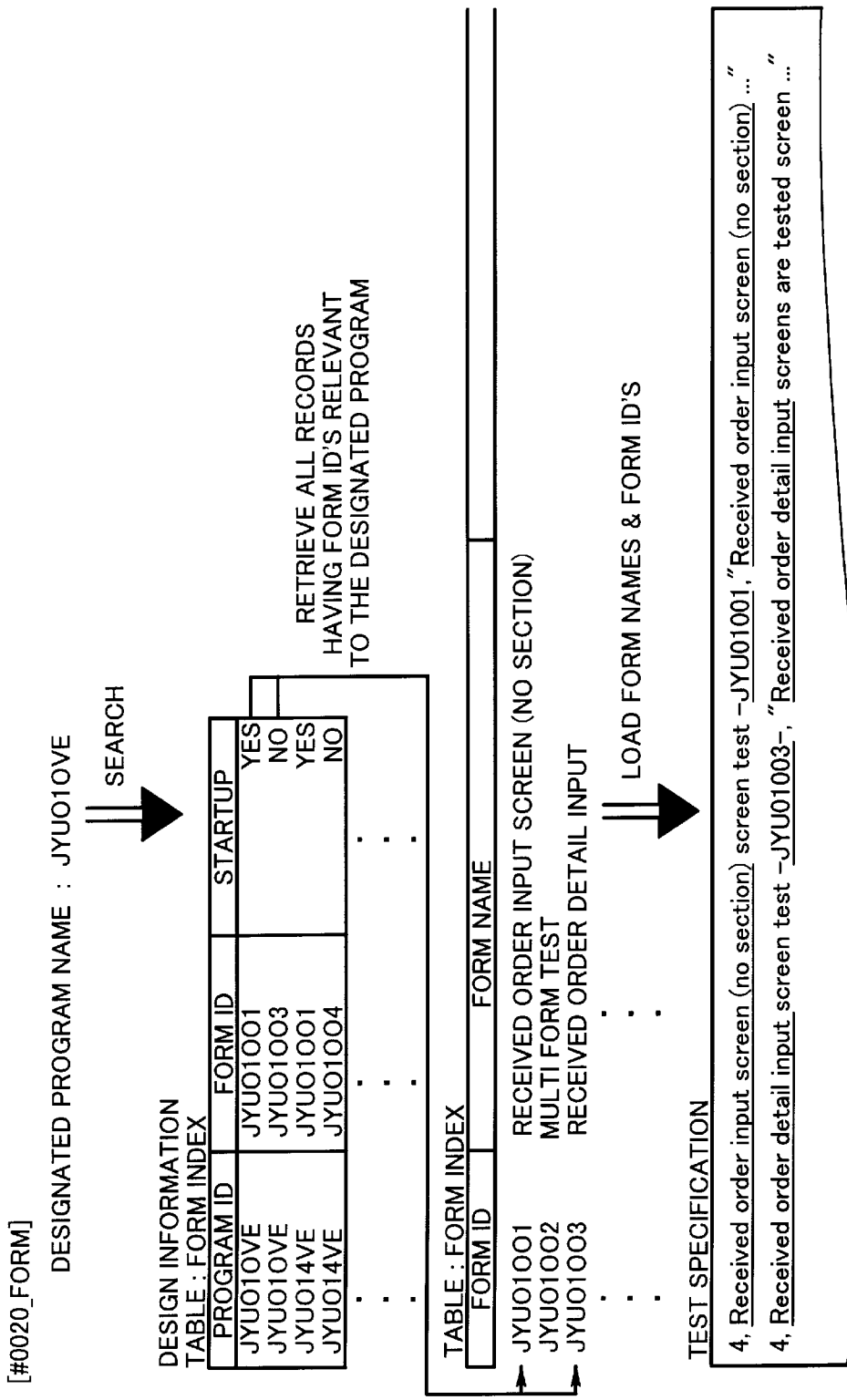
FIG. 20 is a diagram which is useful in explaining a manner of generation of test items containing screen form names.

FIG. 20 illustrates a manner of generation of test items related to a screen form name. When the generation pattern name "#0020_FORM" is designated, a design information table "FORM INDEX" is searched by using a program ID corresponding to a designated program name as a key. As a result, all records of the form ID's associated with the designated program are obtained from the "FORM INDEX". In the illustrated example, there are shown two form ID's "JYU01001" and "JYU01003" associated with the program ID "JYU010VE". The table of the screen list of the design information (see FIG. 8) is searched by using the form ID's, whereby records including the form names "Received order input screen (no section)" and "Received order detail input" are obtained as relevant records. These form names and form ID's are loaded in the test specification.

When there exist a plurality of forms in a single program as described in the above example, a plurality of lines are generated. Further, after the test items of the form names are generated, test item generation concerning the forms is repeatedly carried out as many times as the number of the forms. For instance, in the case of the test configuration INI file (program version) shown in FIG. 13, test items are generated for each of the forms relevant to the generation pattern names "#0030_ACTION" to "#0080_IME".

FIG. 21 illustrates a manner of generation of test items related to an action. In the case of the generation pattern name "#0030_ACTION", assuming that a program ID corresponding to a designated program name is "JYU010VE", the form ID's corresponding to this program ID are already known to be "JYU01001" and "JYU01003" from the table "FORM INDEX" searched when the test items related to the form names are generated. Let it be assumed that form indexes corresponding to these form ID's are "1" and "24", respectively. The table of the group action list in the design information is searched based on these form indexes. In the table shown in FIG. 21, the uppermost one of records having the form index of "1" has a group ID of "0". By looking up the table of a group ID master by using the group ID "0" as a key, it is found that the group ID "0" corresponds to a group constant "F_MODE". The group constant "F_MODE" represents a MODE group, so that by using a word "MODE", "MODE group test" is written in the test specification. In the field of the action ID of the uppermost line of the illustrated table of the group action list, there is an entry of "SUB". By looking up the action definition table, it is found that the action ID "SUB" corresponds to an action name "Inquiry sub", and the action name "Inquiry sub" is written in the test specification. If the MODE group (group ID=0) includes other actions than "Inquiry sub", test items related to these actions are written in the test specification in the same manner as the action having the action name "Inquiry sub". More detailed test items are written into the test specification according to the definition specified by the standard test item file. In the example shown in FIG. 21, the detailed test items are written at lines of "Item check" and "Group transition" both having a level number "8".

Figure 22:
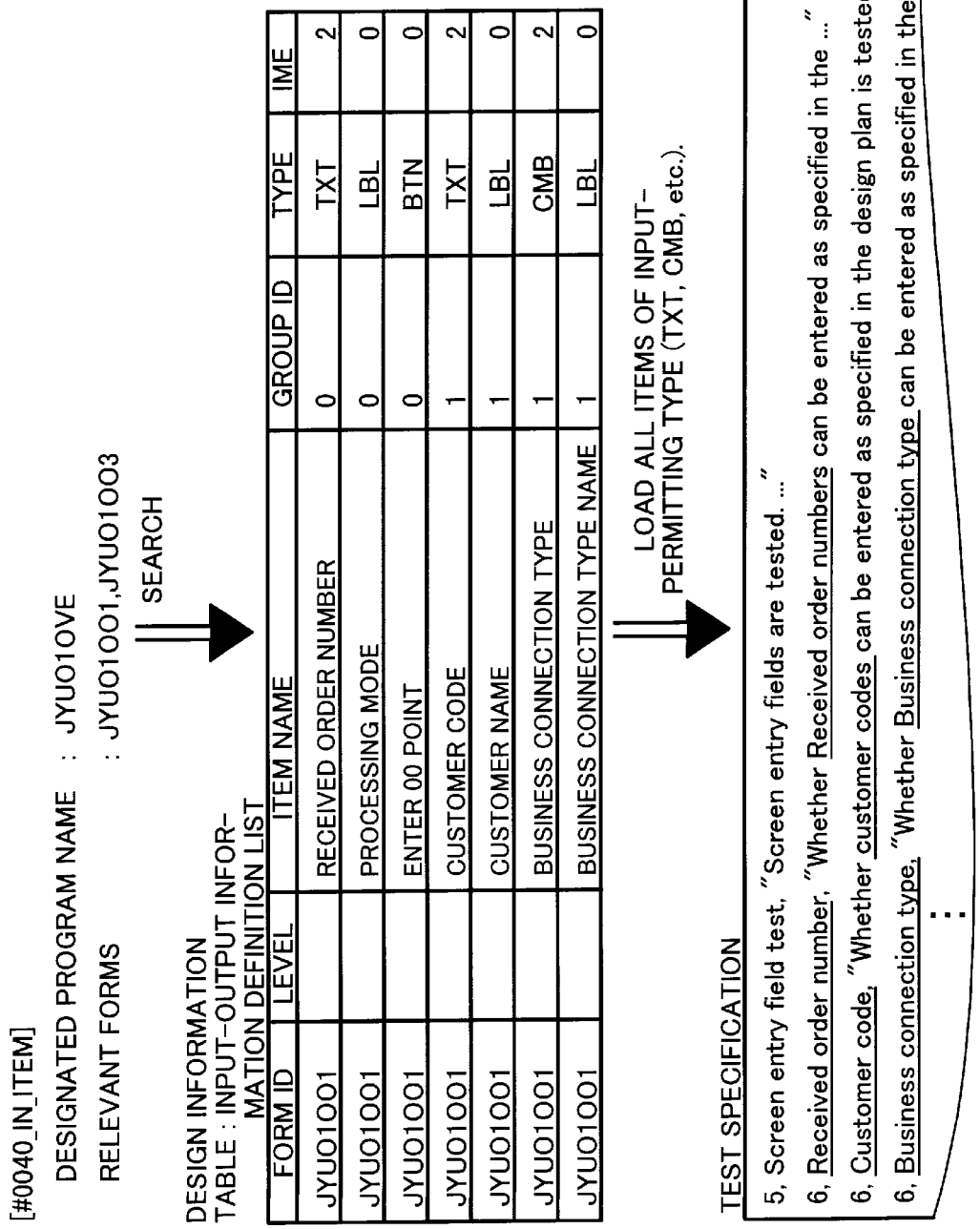
FIG. 22 is a diagram which is useful in explaining a manner of generation of test items related to input items.

FIG. 22 illustrates a manner of generation of test items related to input items. In the case of the generation pattern name "#0040_IN_ITEM", assuming that a program ID corresponding to a designated program is "JYU010VE", the form ID's corresponding thereto are known to be "JYU01001" and "JYU01003" from the table "FORM INDEX". The table of the input-output information definition list (see FIG. 10) of the design information is searched by using these form ID's as keys. This table includes the field for "type". With reference to this field, all items that can be inputted from the screen are obtained. In the illustrated example, TXT (text) and CMB (Combo box) represent types that can be inputted from the screen, and hence, item names "Received order number" and "Business connection type" corresponding to these types are loaded in the test specification.

Figure 23:
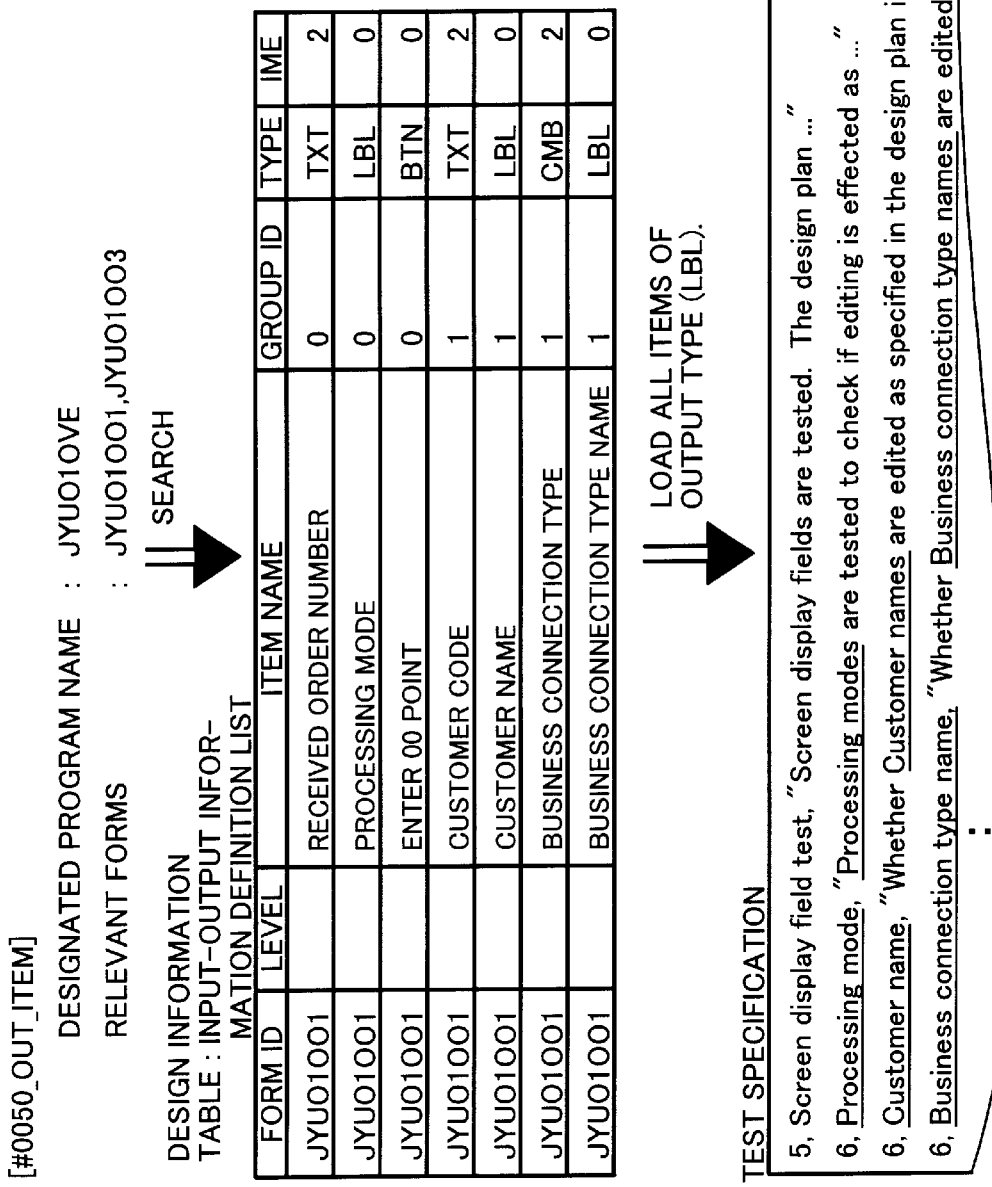
FIG. 23 is a diagram which is useful in explaining a manner of generation of test items related to output items.

FIG. 23 illustrates a manner of generation of test items related to output items. In the case of the generation pattern name "#0050_OUT_ITEM", test items concerning display items are written in the test specification. Similarly to the case of input items, relevant form ID's are determined, and then the input output information definition table of the design information is searched by using these form ID's as keys. "LBL" in the type field represents the type of an item which is displayed on the screen, and hence all the item names of records having "LBL (label)" in the type field thereof are written into the test specification. In the illustrated example, an item name "Processing mode", for instance, is written in the test specification.

Figure 24:
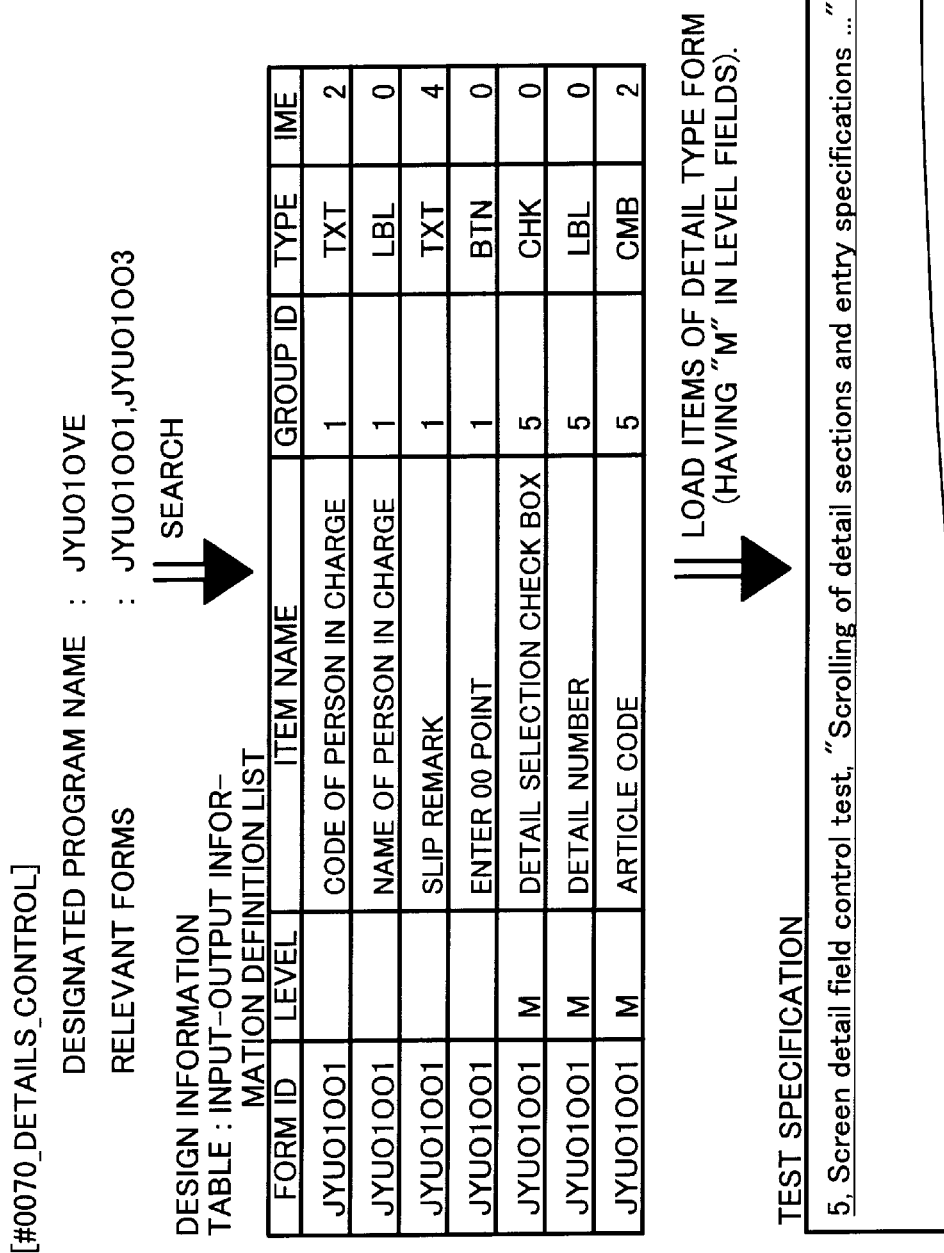
FIG. 24 is a diagram which is useful in explaining a manner of generation of test items related to detail items.

FIG. 24 illustrates a manner of generation of test items related to detail items. In the case of the generation pattern name "#0070_DETAIL_CONTROL", similarly to the above, the table of the input-output information definition is searched by using the relevant form ID's, and then, if a mark "M" representing a detail type which allows entry in the form of a slip is found in a level field, a test item line, e.g. "5". Screen detail field control test, "crolling of detail sections and entry specifications . . . ", is generated.

FIG. 25 illustrates a manner of generation of test items related to IME mode. In the case of the generation pattern name "#0080_IME", from the table of the input-out information definition list, test items for checking whether Japanese input software (IME) mode is a designated mode are generated for all items of the types which allow entry from the screen. In the illustrated example, "TXT (text)" and "CHK (check box)" are types which allow entry from the screen. "CMB (Combo box)", not shown in the example, also belongs to the same category. The IME mode has e.g. nine values as shown in the example shown in FIG. 25. The mode values of the above-mentioned items are each specified in an "IME" field of the table of the input-output information definition list. Accordingly, items of any of types that permit entry from the screen, such as TXT, CHK, and CMB are searched for to obtain "item name" and an "IME" mode value of each of the searched-out items. As to the "IME", a mode name corresponding to each IME mode value is extracted from the description of the IME mode values, and the mode name and the "item name" are combined, and then loaded or written in the test specification. If an item has no mode IME value set therefor, an "item name" having only parentheses added thereto is written in the test specification.

Figure 26:
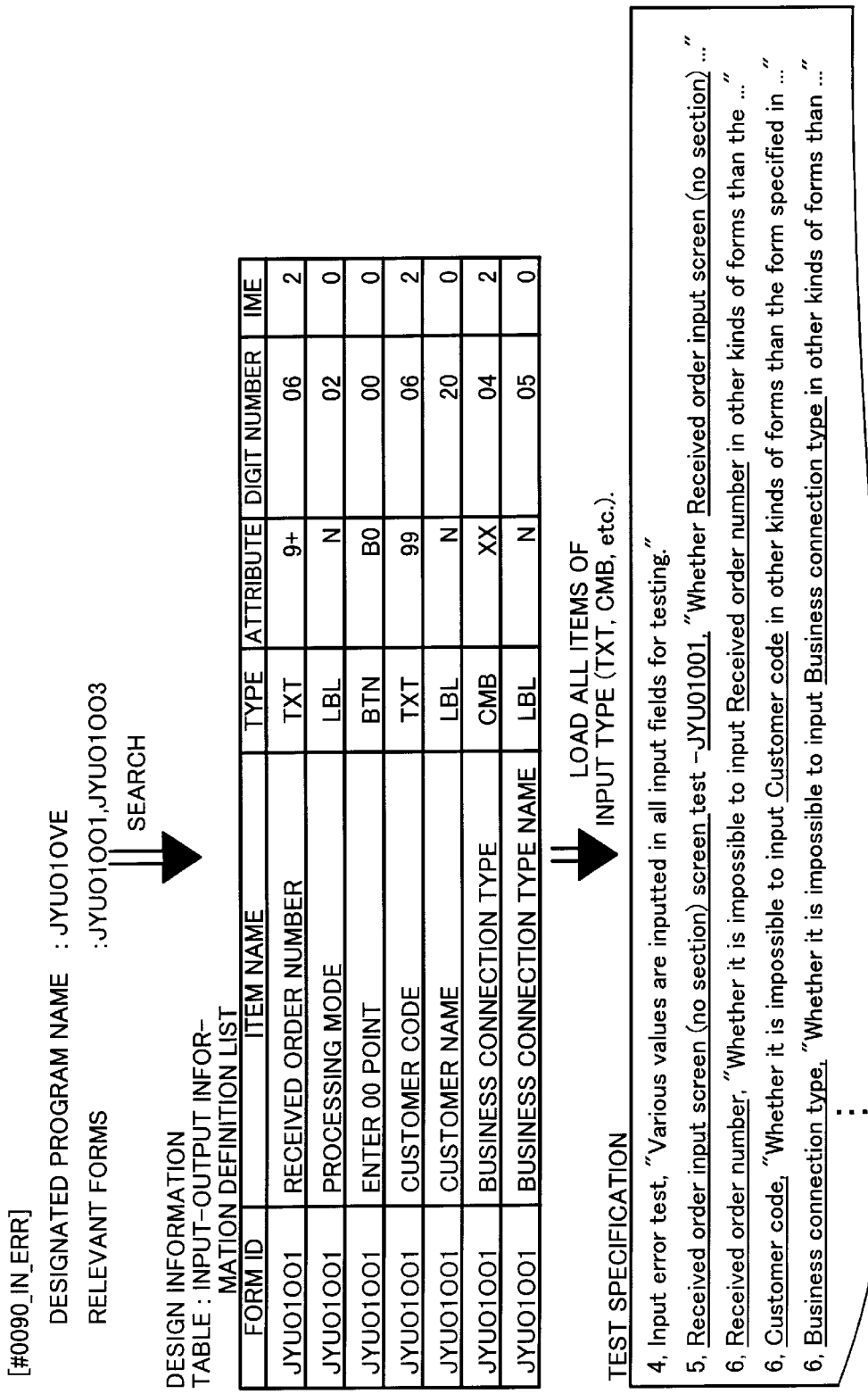
FIG. 26 is a diagram which is useful in explaining a manner of generation of test items related to entry error tests.

FIG. 26 illustrates a manner of generation of test items related to input error tests. In the case of the generation pattern name "#0090_IN_ERR", test items are generated for checking whether or not entry of other kinds than a kind specified in entry-related fields of the table of the input-output information definition list is inhibited. In the illustrated example, the first record of the table of the input-output information definition list has "TXT" in its type field and "9+" in its attribute field. The attribute "9+" indicates that the item has an numeric character attribute, which means that entry of other characters than numeric characters is required to be handled as an error. To generate a test item for checking on this kind of entry error, it is only required to obtain an "item name" from each record with the field of a type that allows entry from the screen, such as TXT or CMB, and then load the "item name" in the test specification.

The test specification generated as described above is outputted in a list form by the use of the test tool "SQA Suite".

Figure 27:
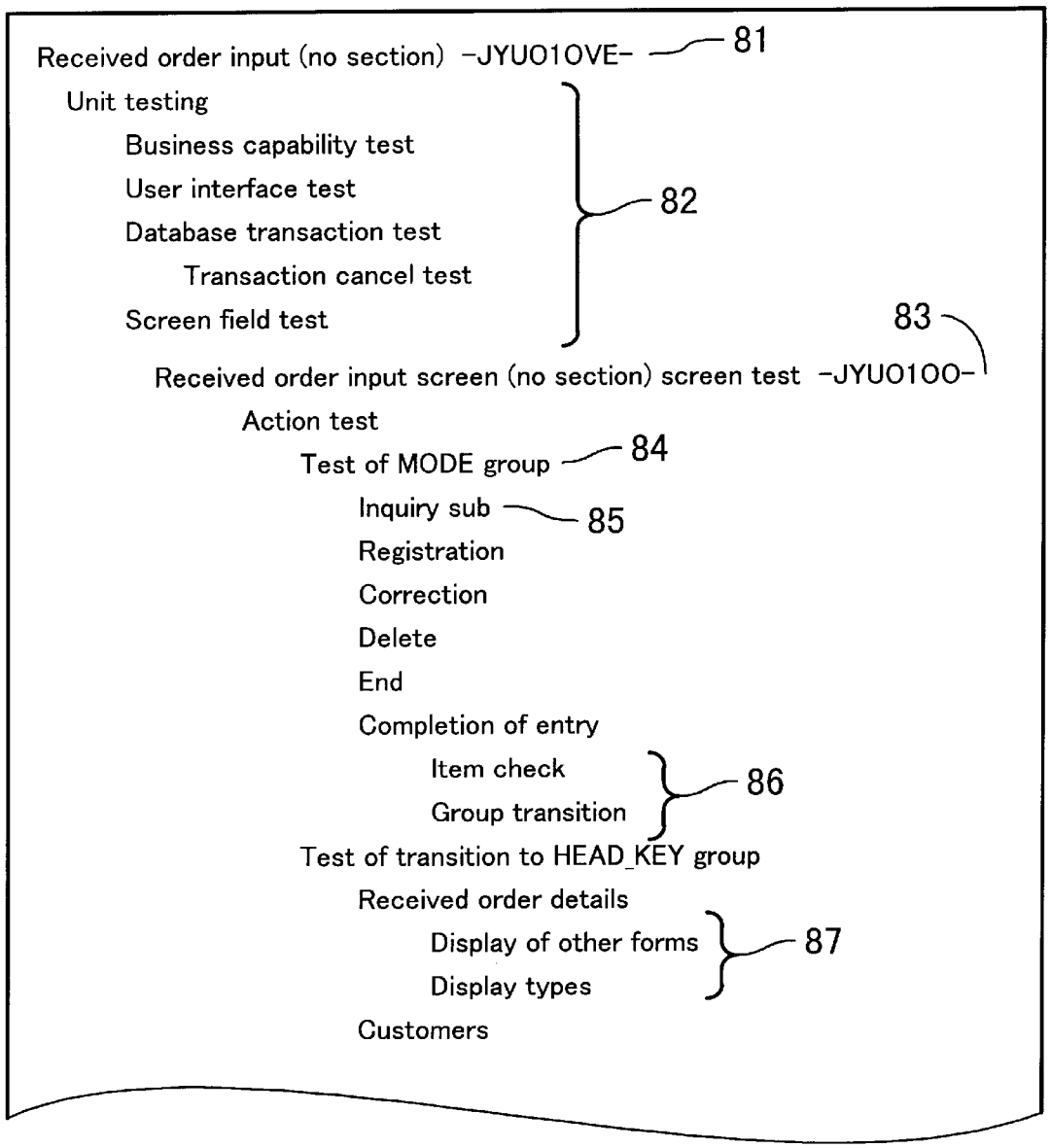
FIG. 27 is a diagram showing an example of a list output of a test specification.

FIG. 27 shows an example of the test specification in a list form. In the illustrated example, reference numeral 81 designates a line containing a program name, and reference numeral 82 a portion containing fixed output lines arranged in a fashion indented according to their level number, respectively. Reference numerals 83, 84, and 85 designate a line containing one of test items generated, form by form, a line containing one of test items generated, group by group, and a line containing one of test items generated, action by action. Further, reference numerals 86 and 87 designate respective portions containing test items generated based on information from the standard test item INI file.

Finally, description will be made of a routine for processing executed by the test specification generation program 14a. However, this description will not refer to the program capability of automatically generating a test plan.

Figure 28:
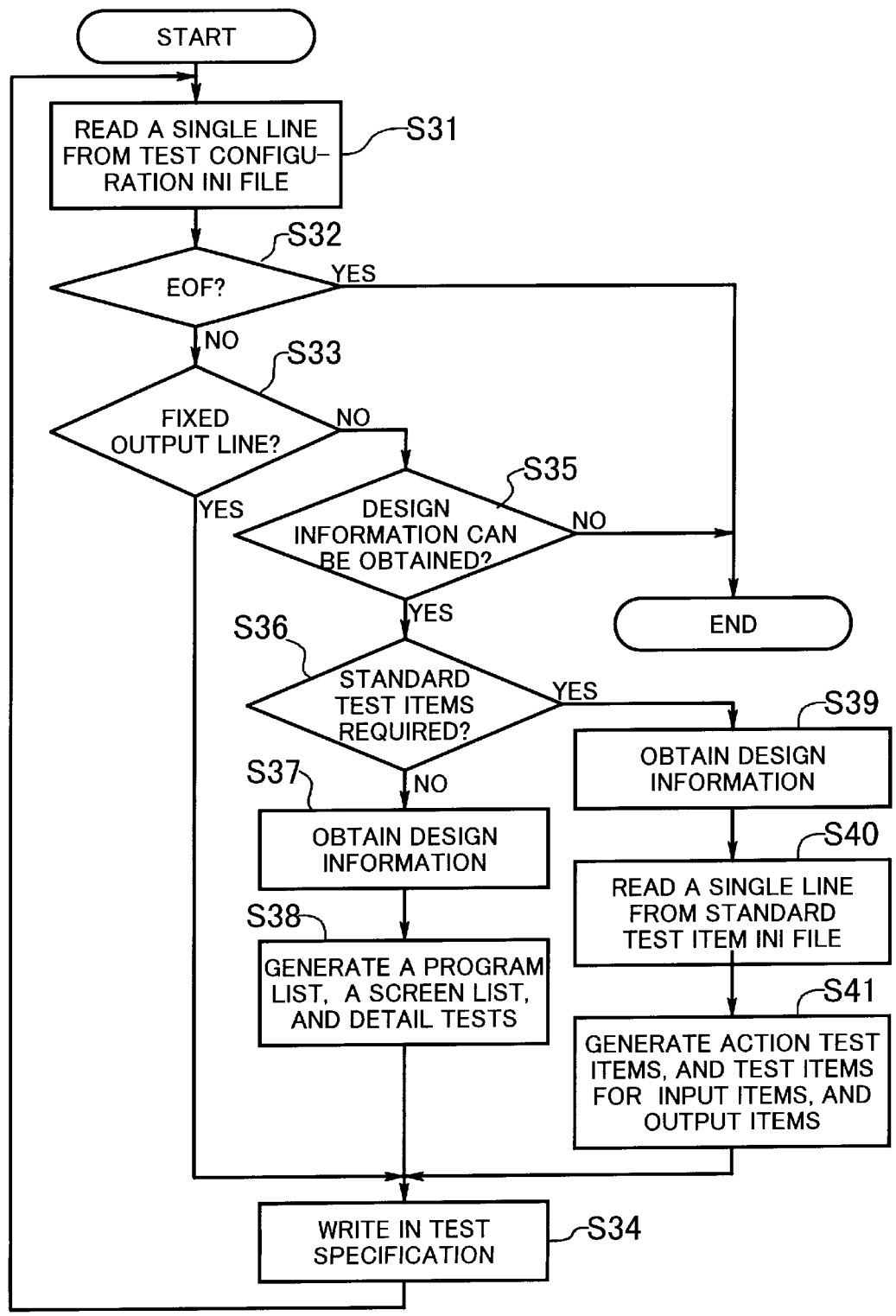
FIG. 28 is a flowchart showing a routine for processing executed by a test specification generation program.

FIG. 28 shows the routine for processing executed by the test specification generation program. First, a single line is read out from the test configuration INI file (step S31). Next, it is determined whether or not the line is an end-of-file label (EOF) indicative of the end of the file (step S32). If the line is the end of the file, the program is immediately terminated, whereas if the line is not the end of the file, it is determined whether or not the line is a fixed output line (step S33). If the line is determined to be a fixed output line, the line is written in the test specification file (step S34). On the other hand, if the line is a program output line, it is determined whether or not design information can be obtained (step S35). If design information does not exist or cannot be read normally, the program is immediately terminated. If design information can be obtained, it is determined from the pattern name of the program output line whether or not the standard test item INI file is required (step S36). If the standard test item INI file is not required, i.e. if it is possible to generate test items from the tables of the design information alone, information required for generation of test items is obtained from relevant tables according to the pattern name of the program output line (step S37). The information thus obtained e.g. from the program list, the screen list, and detail tests is processed by the program (step S38), and written in the test specification. Depending on the pattern name, a plurality of lines are extracted or a single line is extracted. On the other hand, if the standard test item INI file is required, information required for test item generation is obtained from relevant tables of the design information according to the pattern name (step S39), and the standard test item INI file is read to generate further detailed pattern test items (step S40). Then, the obtained design information and pattern details are processed by the program to generate test items, such as action test items, input-output items, or output items (step S41), and written in the test specification. In this case as well, depending on the pattern name and pattern details of the standard test item INI file, a plurality of lines are written or a single line is written in the test specification.

In the description above for the data analysis means, statements written in the test configuration file are read, line by line. The statement, however, is also possible to be read, file by file.

As described above, according to the present invention, a test specification is automatically generated from design information stored during a design process according to a test configuration file describing an outline of the test specification and a standard test item file describing details of test items. Since design information entered during the design process is utilized, the labor of entry operations during the testing process is alleviated, and the test designing operations can be standardized and made efficient.

Further, test operations can be performed based on the test specification which inherits the design information. By testing a program produced during the production process by using the test specification, the quality of the application program can be further improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A test specification generation system for generating a test specification based on design information, the test specification generation system comprising:
   test configuration storage means for storing a test configuration file describing a fundamental configuration of said test specification;
   design information reading means for reading design information generated in a design process;
   data analysis means for reading statements written in said test configuration file, line by line, for analysis to determine whether a read statement line is a fixed output line or a program output line;
   first test item generation means for generating a test item from said design information read by said design information reading means, when said data analysis means determines that said read statement line is a program output line; and
   test specification writing means for outputting each statement line determined by said data analysis means to be a fixed output line and said test item generated by said first test item generation means.

2. A test specification generation system according to claim 1, further including test item storage means for storing a standard test item file describing details of standard test items, test item determination means for determining whether generation of a test item requires said design information alone or not only said design information but also said standard test items when said data analysis means determines that said read statement line is a program output line, and second test item generation means for generating a test item based on said design information read by said design information reading means as well as said standard test items described in said standard test item file, and then delivering said test item to said test specification writing means, when said test item determination means determines that said generation of said test item requires not only said design information but also said standard test items.

3. A test specification generation system according to claim 2, wherein said test item determination means determines whether said generation of said test item requires said design information alone or not only said design information but also said standard test items, by determining whether or not said standard test item file is designated in said test configuration file.

4. A test specification generation system according to claim 1, wherein said test configuration file stored in said test configuration storage means has each line thereof formed by a hierarchical information section and a data section, hierarchical information of said hierarchical information section being outputted as it is by said test specification writing means.

5. A test specification generation system according to claim 2, wherein said standard test item file stored in said standard test item storage means comprises
   pattern names of patterns of said design information and pattern details related to said patterns.

6. A computer-readable storage media storing a test specification generation program comprising:
   test configuration management means for managing a test configuration file describing a fundamental configuration of a test specification;
   design information reading means for reading design information generated in a design process;
   standard test item management means for managing a standard test item file describing details of test items;
   data analysis means for analyzing statements written in said test configuration file, line by line, to determine whether a read statement line is a fixed output line or a program output line;
   test item determination means for determining whether generation of a test item requires said design information alone or not only said design information but also said standard test items, when said read statement line is a program output line;
   first test item generation means for generating test items based on said design information;
   second test item generation means for generating test items based on said design information and said standard test items: and
   test specification writing means for outputting said fixed output line analyzed by said data analysis means and said test items generated by said first test item generation means and said test items generated by said second test item generation means, to generate a test specification file.

7. A test specification generation system for generating a test specification based on design information, the test specification generation system comprising:
   test configuration storage means for storing a test configuration file describing a fundamental configuration of said test specification;

design information reading means for reading design information generated in a design process;

data analysis means for reading statements written in said test configuration file, for analysis to determine whether a read statement line is a fixed output line or a program output line;

first test item generation means for generating a test item from said design information read by said design information reading means, when said data analysis means determines that said read statement line is a program output line; and test specification writing means for outputting each statement line determined by said data analysis means to be a fixed output line and said test item generated by said first test item generation means.

* * * * *